(12) United States Patent  (10) Patent No.: US 7,712,719 B2
Derry et al.  (45) Date of Patent: May 11, 2010

(54) FOLDING SUPPORT STAND FOR PORTABLE ELECTRONIC DEVICES

(75) Inventors: Bradley A. Derry, Easton, PA (US); Robert Altonji, Quakertown, PA (US); Odd N. Oddsen, Jr., Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 171 days.

(21) Appl. No.: 11/789,692

(22) Filed: Apr. 25, 2007

(65) Prior Publication Data

US 2008/0265109 A1    Oct. 30, 2008

(51) Int. Cl.
*A47B 95/00* (2006.01)
(52) U.S. Cl. .................................................. 248/346.06
(58) Field of Classification Search ................ 248/447, 248/454, 460, 462, 463, 464, 165, 170, 88, 248/917, 918, 441.1, 453, 455
See application file for complete search history.

(56) References Cited

U.S. PATENT DOCUMENTS

| | | | |
|---|---|---|---|
| 2,803,872 A | 8/1957 | Massa | |
| 5,205,526 A * | 4/1993 | Deutsch | 248/449 |
| 5,358,204 A | 10/1994 | Terada | |
| 5,383,634 A | 1/1995 | Liao et al. | |
| 5,390,885 A | 2/1995 | Shen et al. | |
| D357,828 S | 5/1995 | Liao et al. | |
| 5,497,971 A | 3/1996 | Spiro | |
| 5,957,417 A | 9/1999 | Yu et al. | |
| 6,017,012 A | 1/2000 | Henson, Jr. | |
| 6,113,040 A | 9/2000 | Yu et al. | |
| 6,412,742 B1 | 7/2002 | Yu et al. | |
| 6,533,228 B1 | 3/2003 | Yu et al. | |

(Continued)

FOREIGN PATENT DOCUMENTS

GB    19098172    2/1910

(Continued)

OTHER PUBLICATIONS

"Notebook Spyder Laptop Stand" retrieved from the Internet at <http://www.ergostoreonline.com/notebook_spyder.html> on Mar. 8, 2007 (1 page).

(Continued)

*Primary Examiner*—J. Allen Shriver, III
*Assistant Examiner*—Erin Smith
(74) *Attorney, Agent, or Firm*—Design IP

(57) ABSTRACT

The present invention provides a portable support stand for various devices such as laptop computes, tablet PCs and other electronic equipment. The stand has a tripod configuration which promotes stability of the user device. The front legs of the tripod may be adjusted between compact and extended positions, and may be placed in a position relative to the rear leg anywhere from 0° in a fully closed position to approximately 180° in a fully open position. Audible indicators are used with overall stand adjustment and with adjustment of stoppers at the ends of the front legs. Adjustment of the front legs relative to the rear leg employs a pivot section, including a finger disc spring, an adjustment actuator and an engagement member between the spring and the actuator. The engagement member includes projections or dimples which engage receptacles on an engagement member to secure the stand in a desired arrangement.

19 Claims, 28 Drawing Sheets

U.S. PATENT DOCUMENTS

| | | | |
|---|---|---|---|
| 6,579,017 B2 * | 6/2003 | Wei | 396/428 |
| D495,337 S | 8/2004 | Zerman et al. | |
| 6,886,966 B2 * | 5/2005 | Humphrey | 362/417 |
| D538,554 S * | 3/2007 | Tai | D6/466 |
| D539,806 S | 4/2007 | Yu et al. | |
| 2002/0088914 A1 | 7/2002 | Yu | |
| 2004/0007651 A1 | 1/2004 | Williams et al. | |
| 2006/0255229 A1 | 11/2006 | Cheng | |
| 2007/0012827 A1 | 1/2007 | Fu et al. | |
| 2007/0075208 A1 * | 4/2007 | Chen | 248/455 |
| 2007/0096002 A1 * | 5/2007 | Knight | 248/460 |

OTHER PUBLICATIONS

"Laptop Prop Laptop Stand" retrieved from the Internet at <http://www.ergostoreonline.com/laptop-prop-laptop-stand.html> on Mar. 8, 2007 (1 page).

"STANDIT The ergonomic laptop sand to improve your posture" retrieved from the Internet at http:// www.standit.com/models.html <http://www.standit.com/models.html> on Mar. 8, 2007 (2 pages).

U.S. Appl. No. 11/508,367, filed Aug. 23, 2006, entitled "Laptop Holder for Extension Arm", (56 pages).

U.S. Design Appl. No. 29/261,219, filed Jun. 9, 2006, entitled "Laptop Holder", (8 pages).

Cricket Laptop Stand, Dec. 10, 2007, http://www.en-genius.net/site/zones/engeniusBLOG/greenpowerZONE/ gme_121007.

* cited by examiner

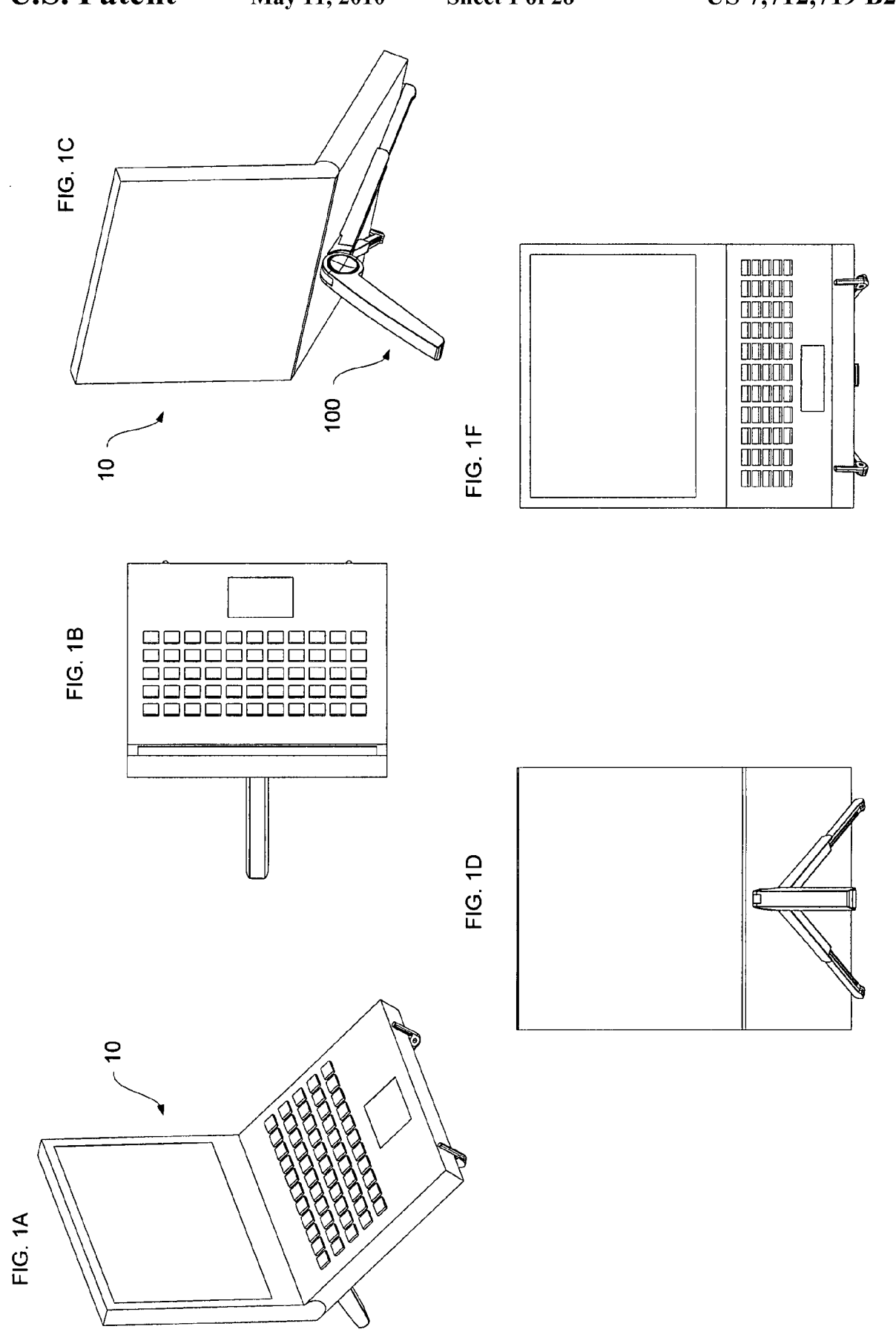

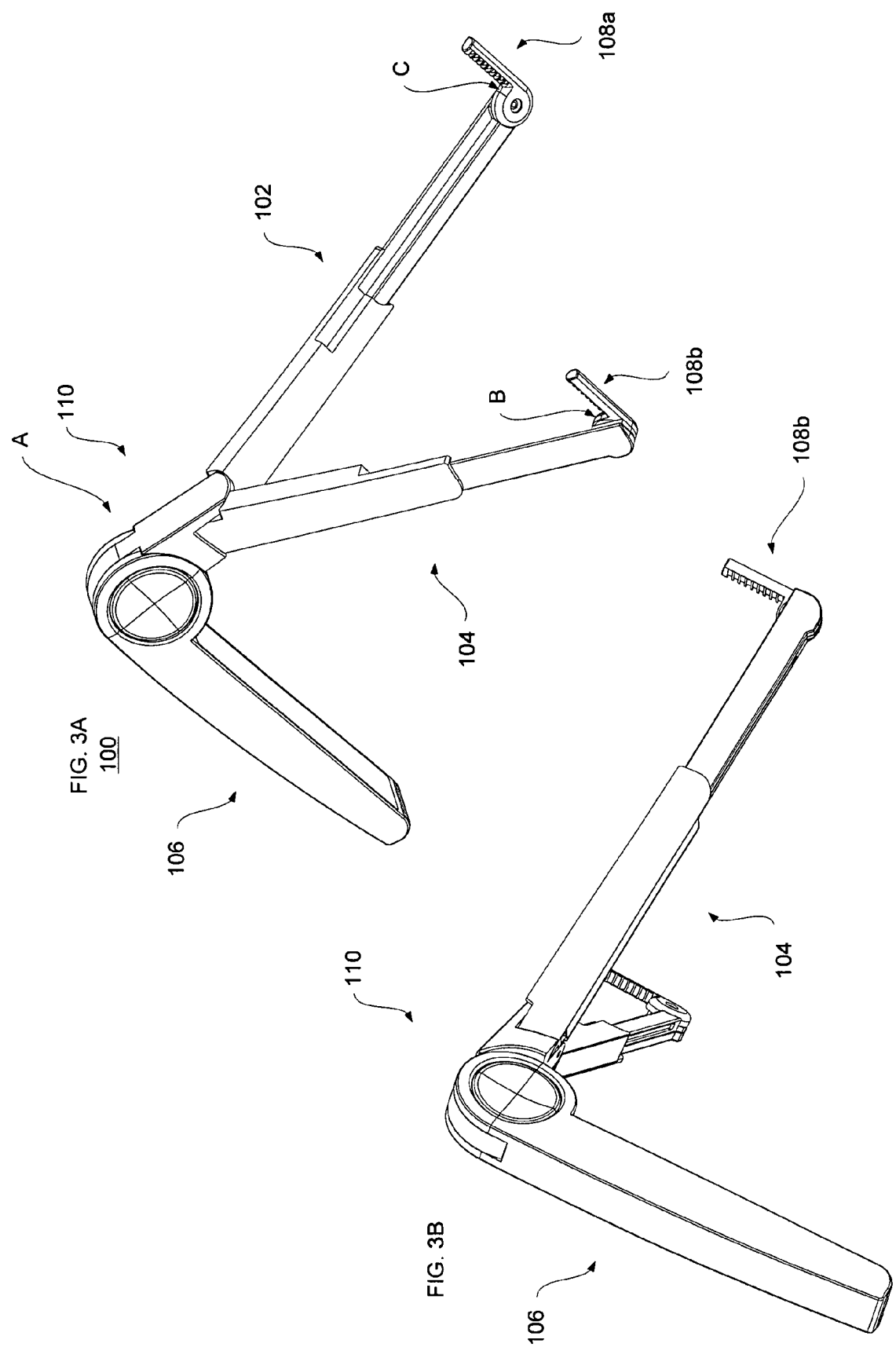

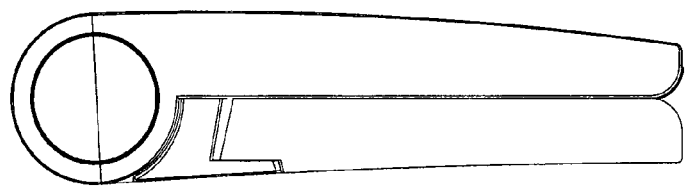
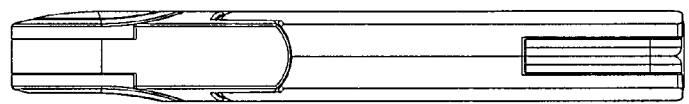
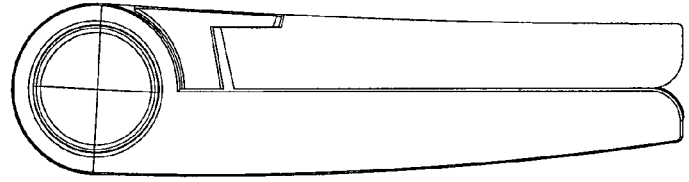
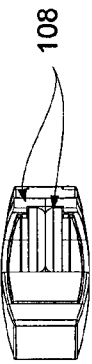
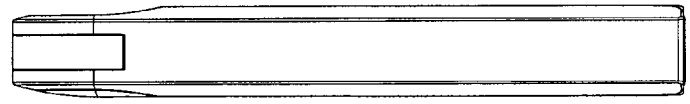
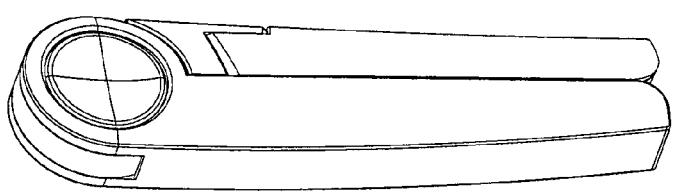
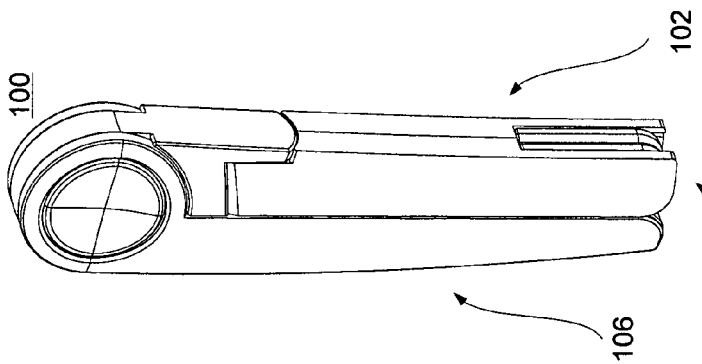

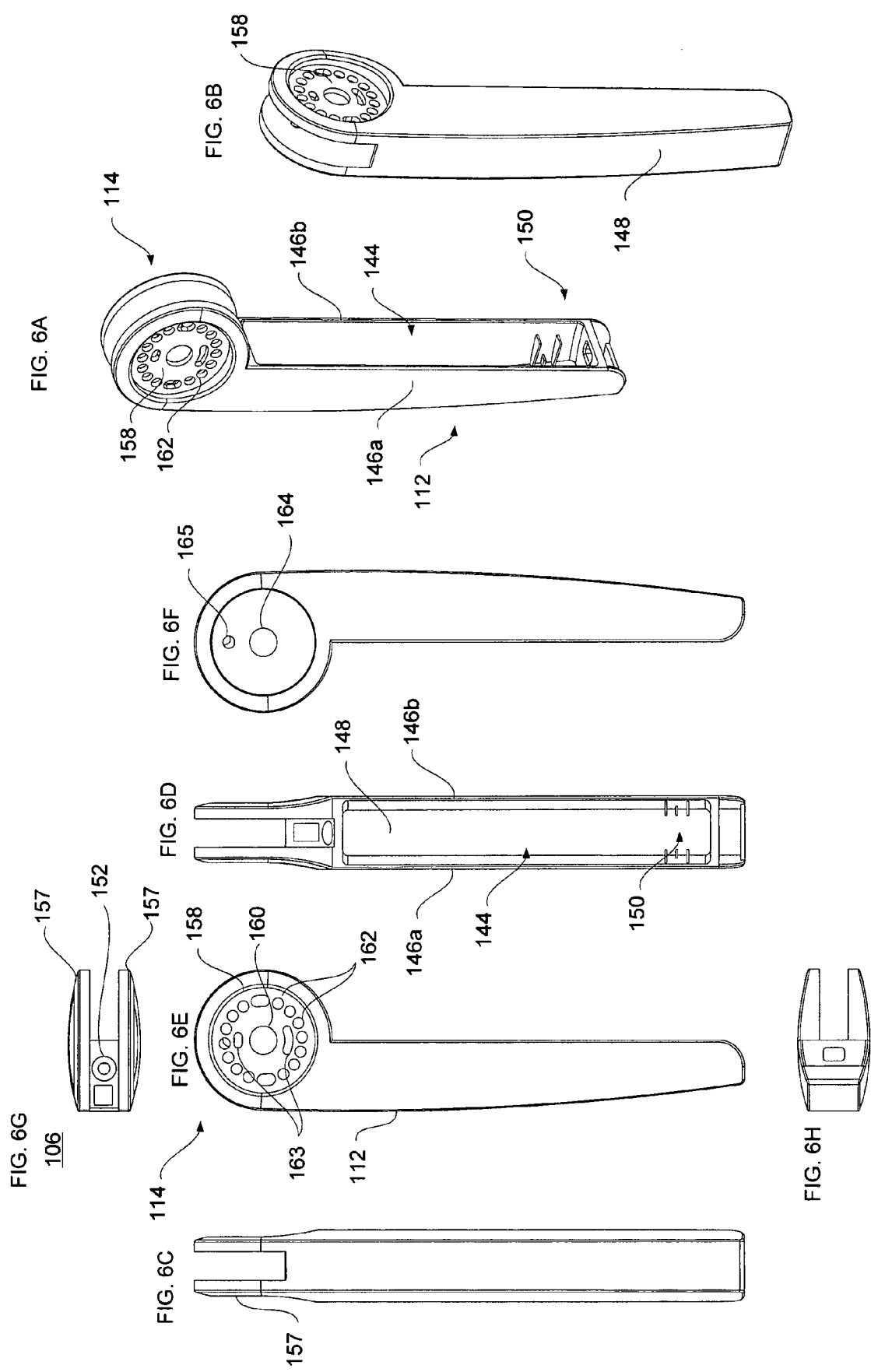

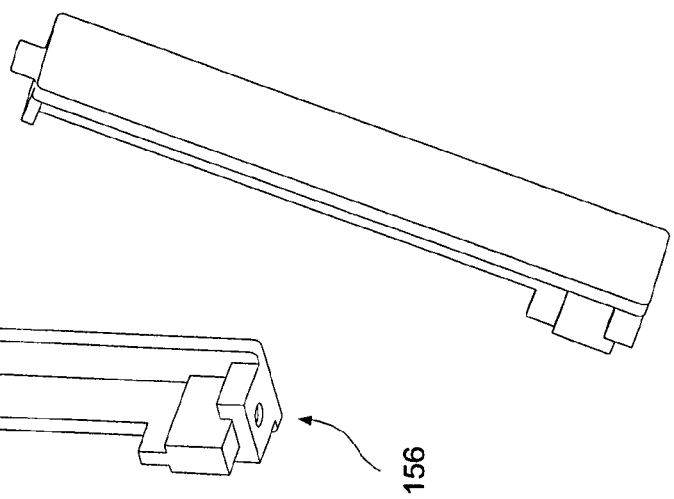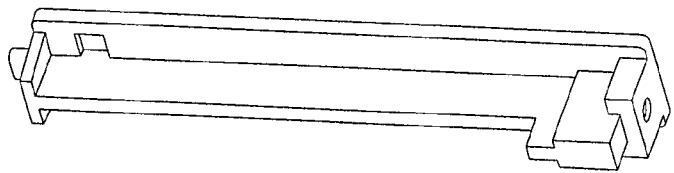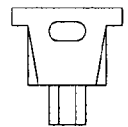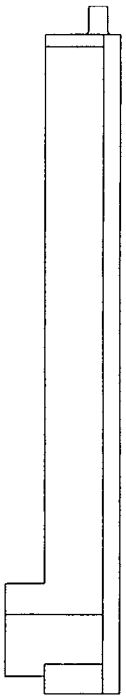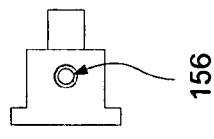

118
166

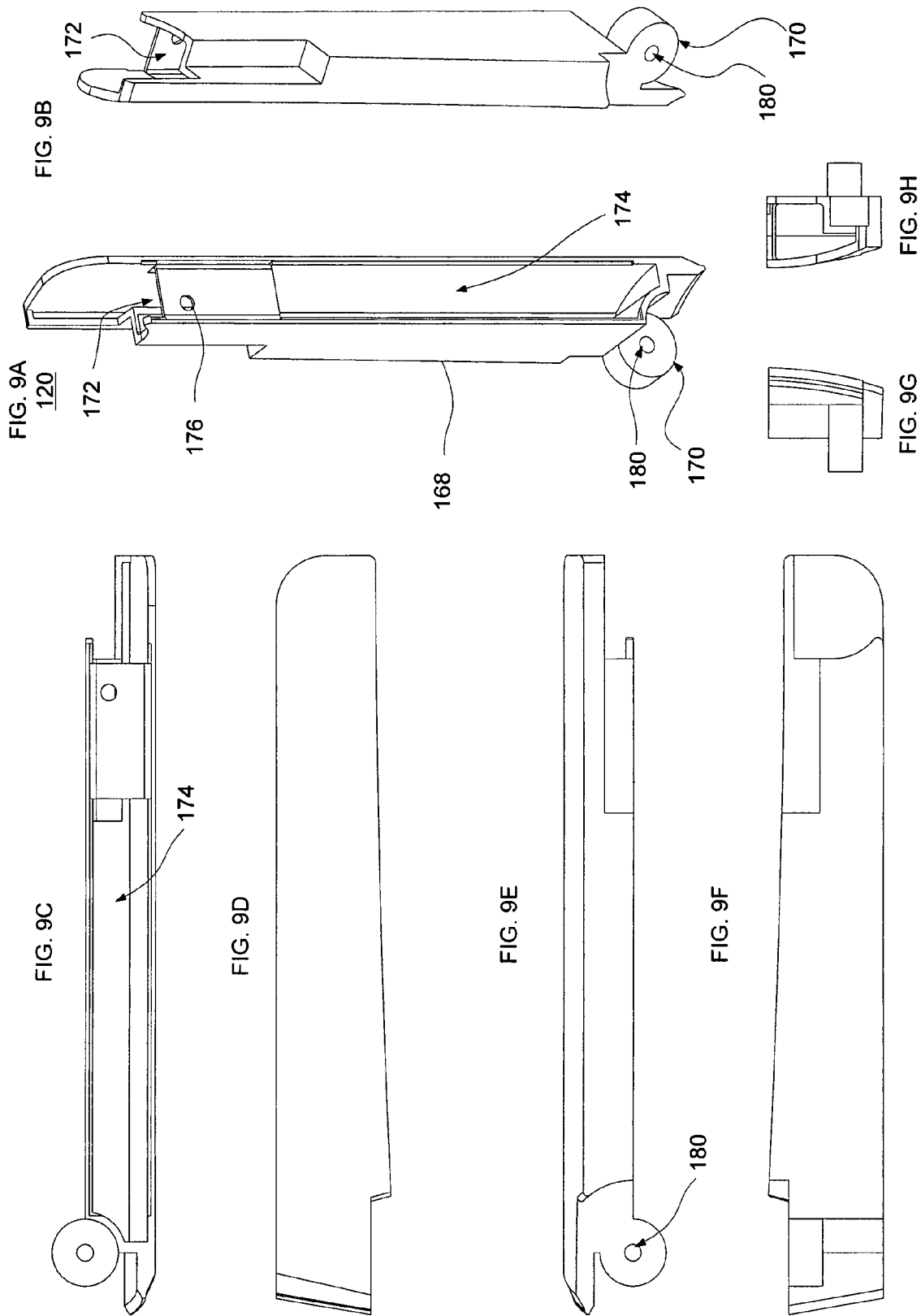

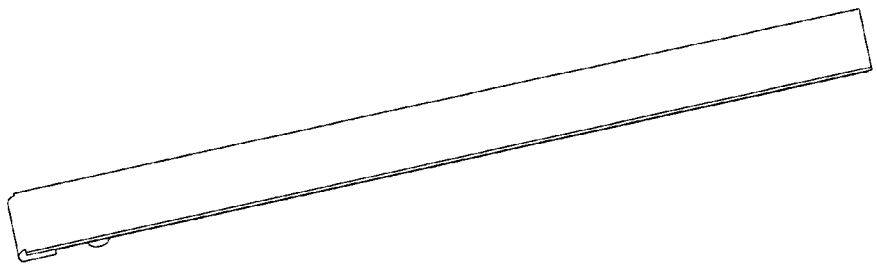
FIG. 10B
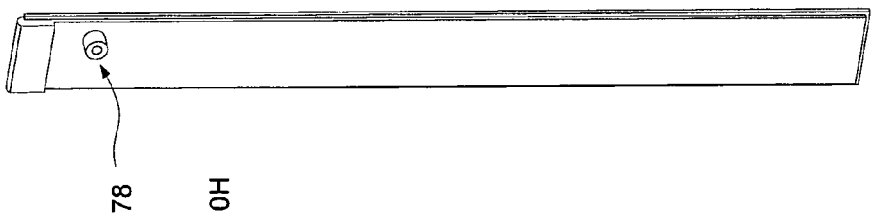
FIG. 10A
124
178
FIG. 10H
FIG. 10C
FIG. 10D
FIG. 10E
FIG. 10F
FIG. 10G

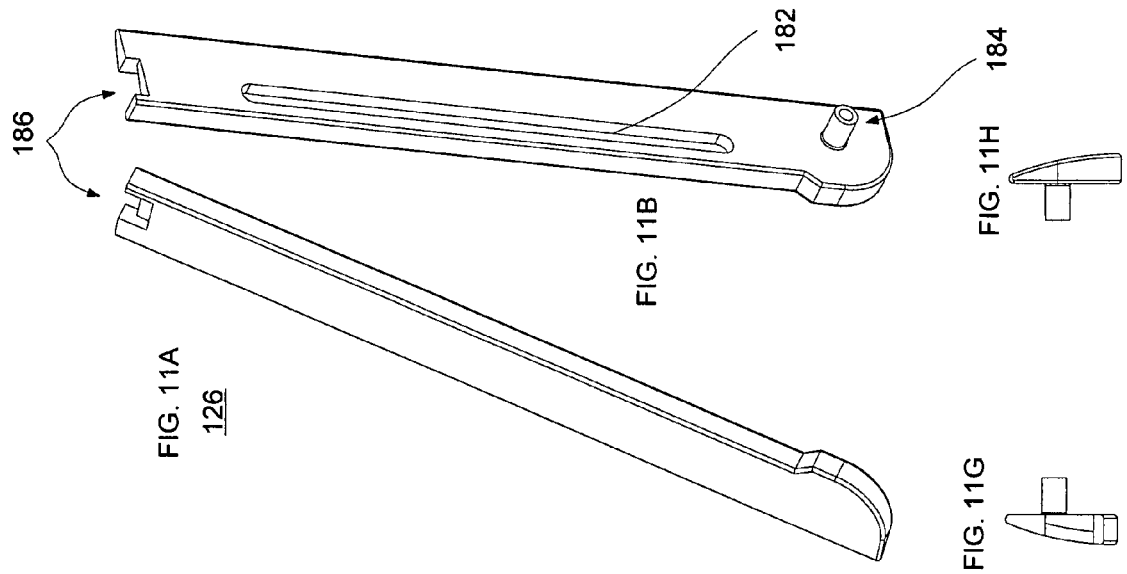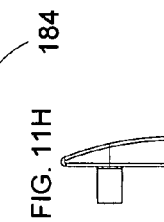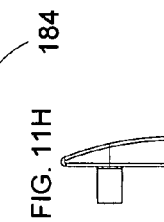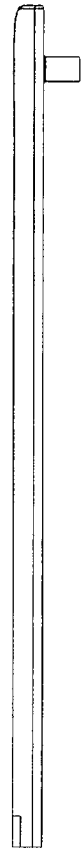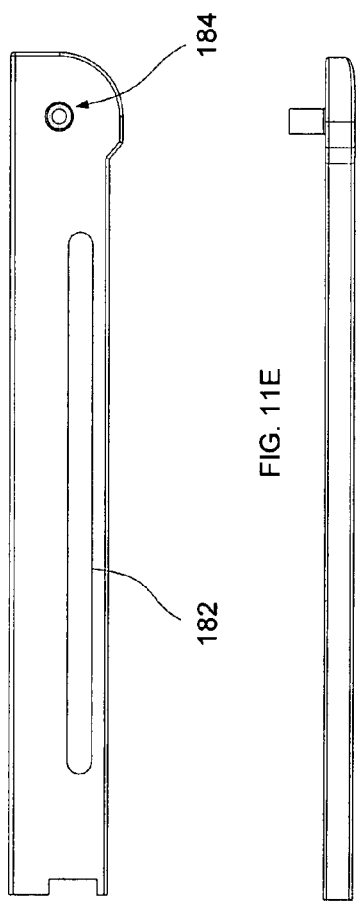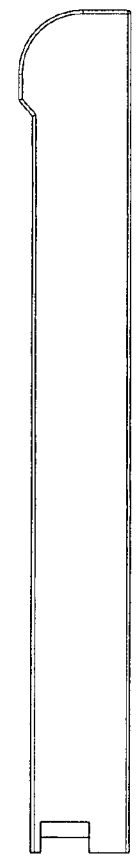

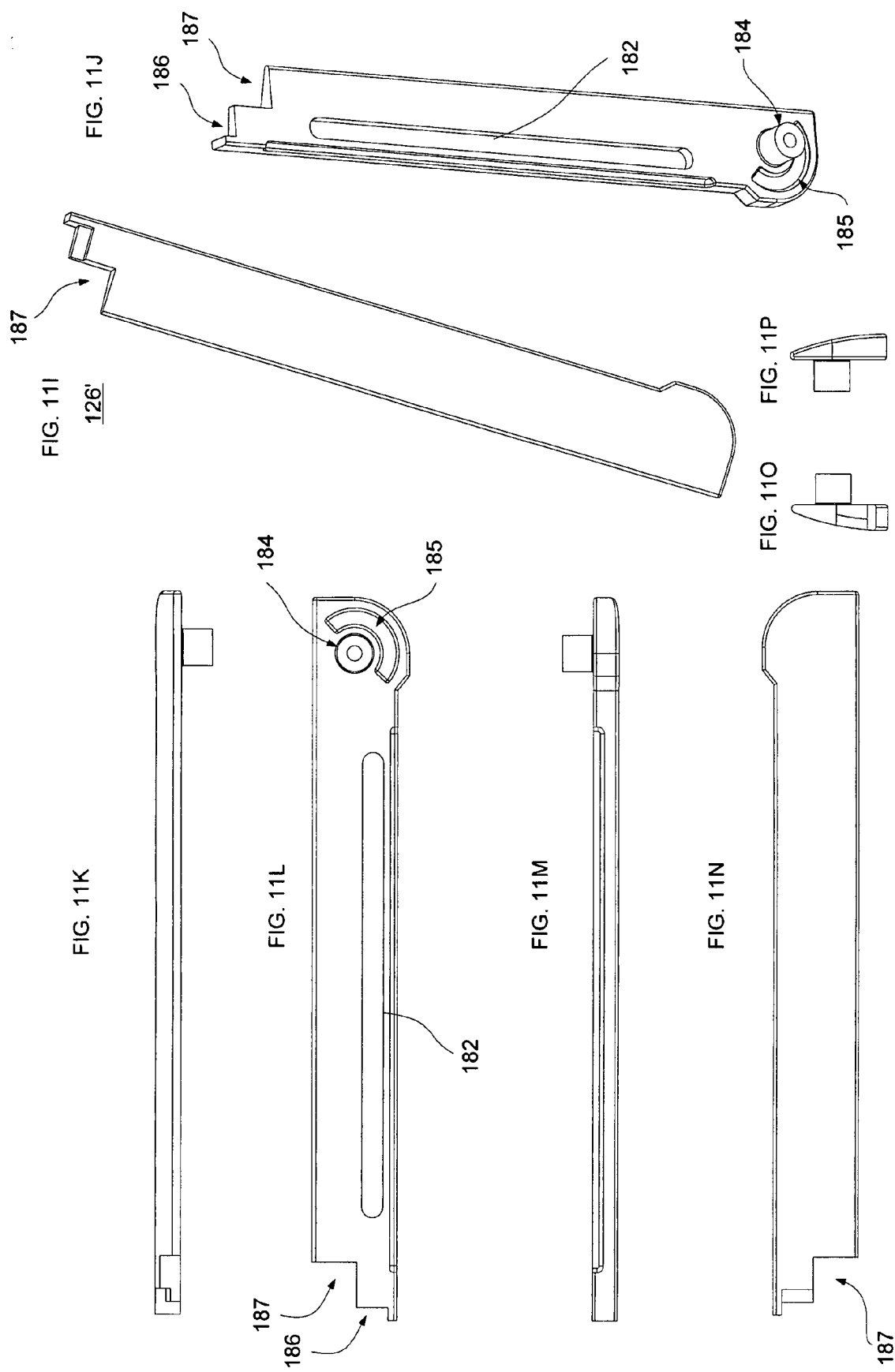

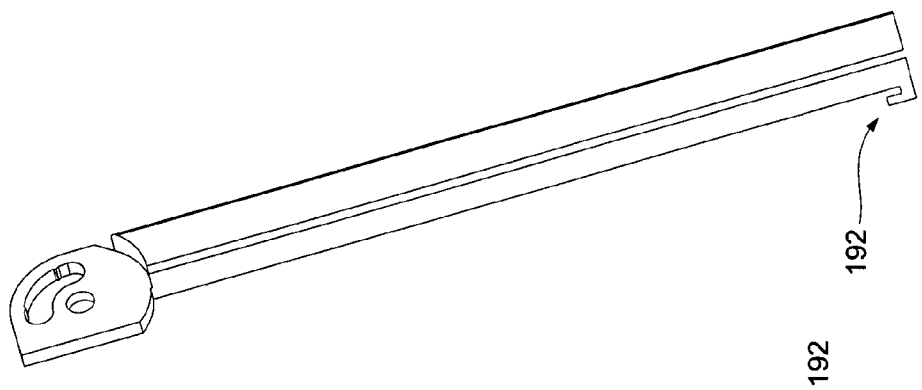
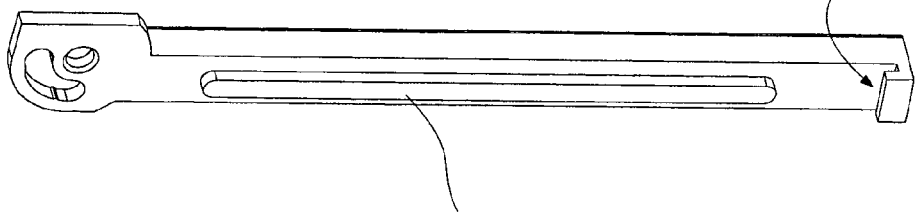
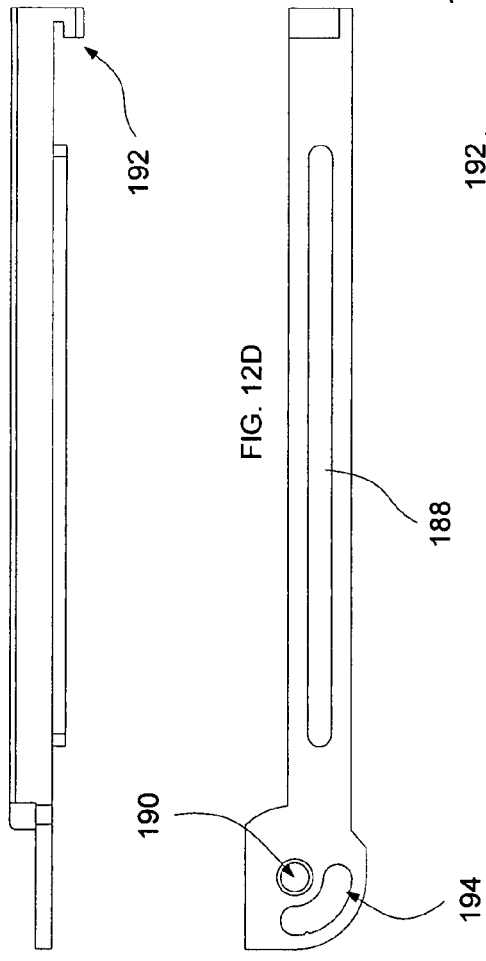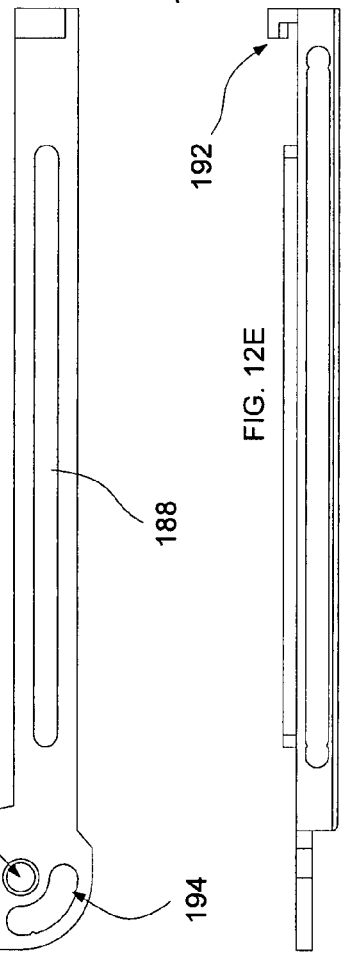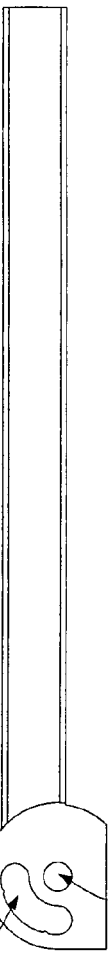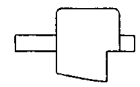

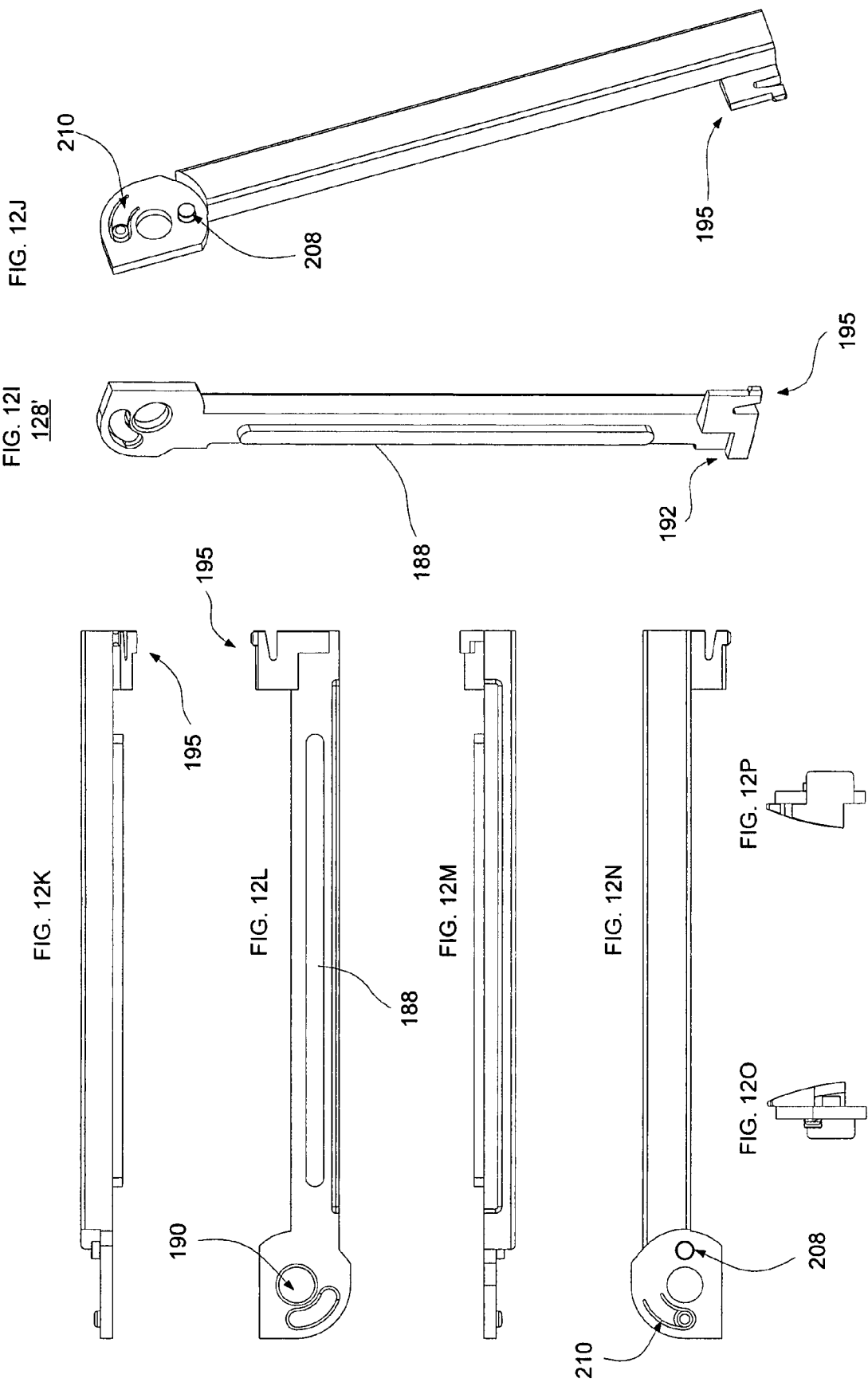

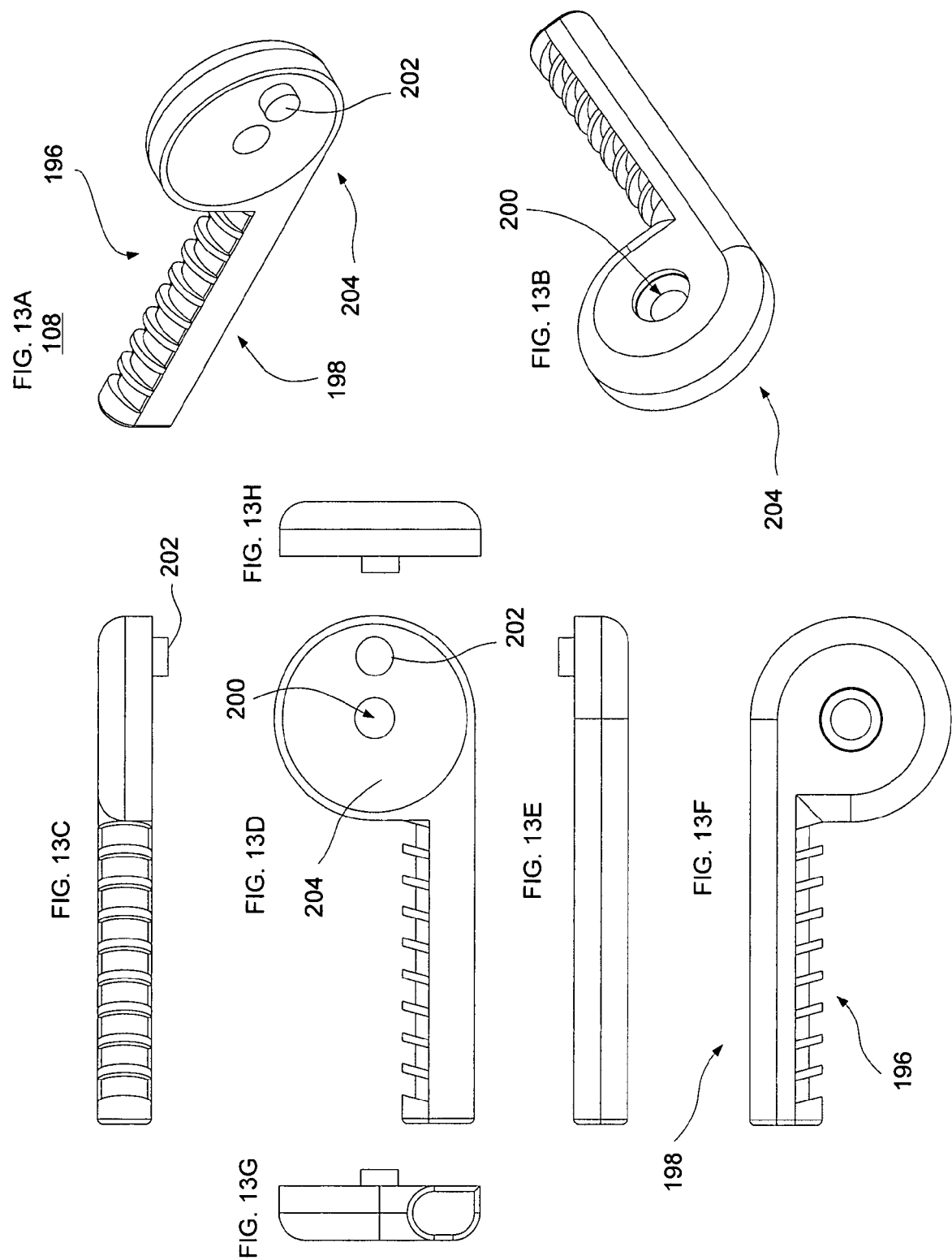

14B – 14B

14A – 14A

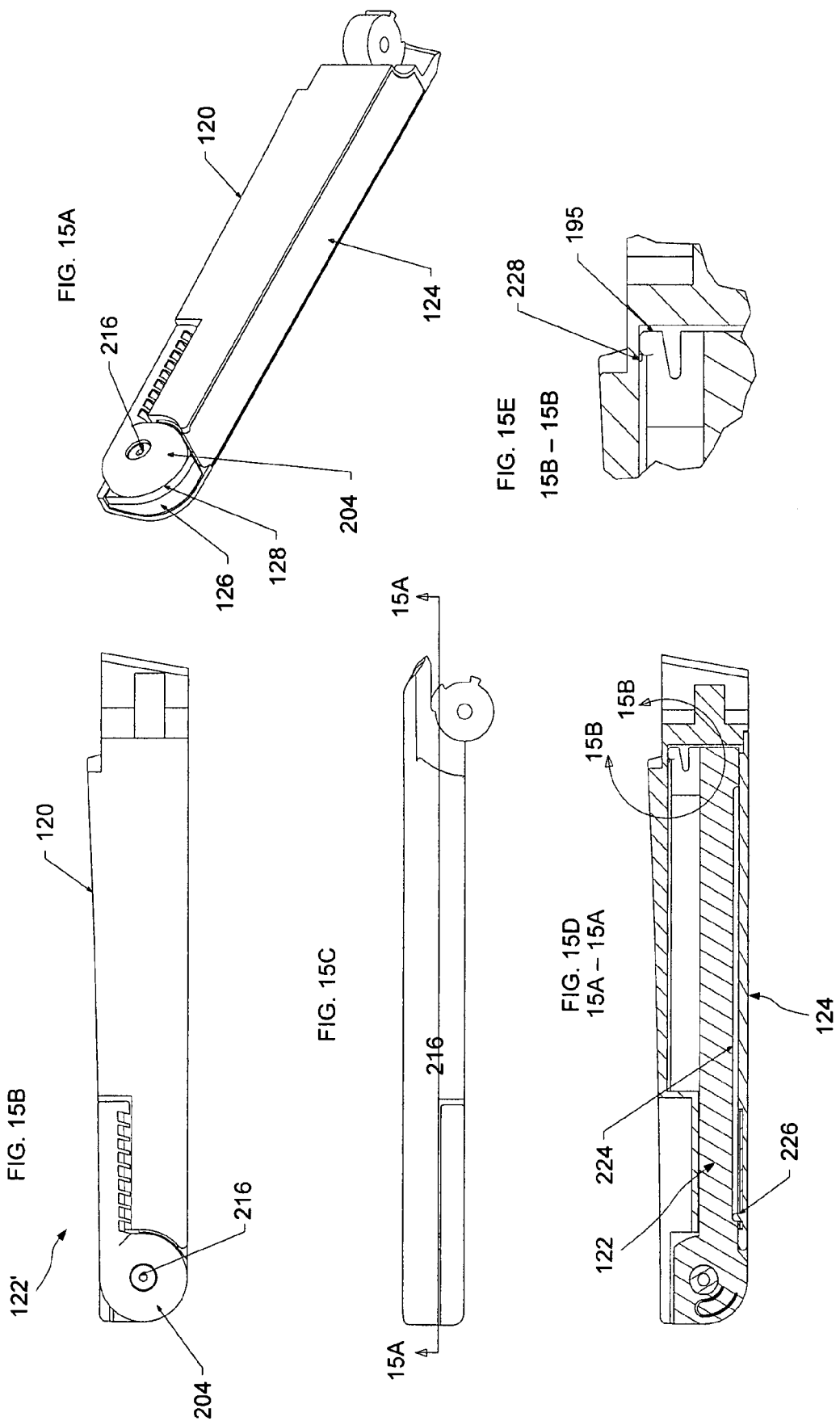

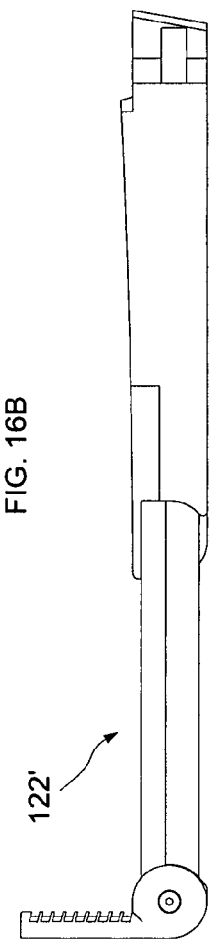
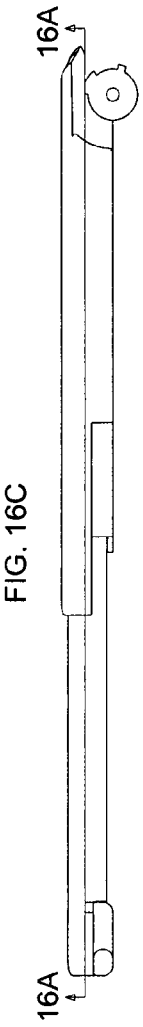
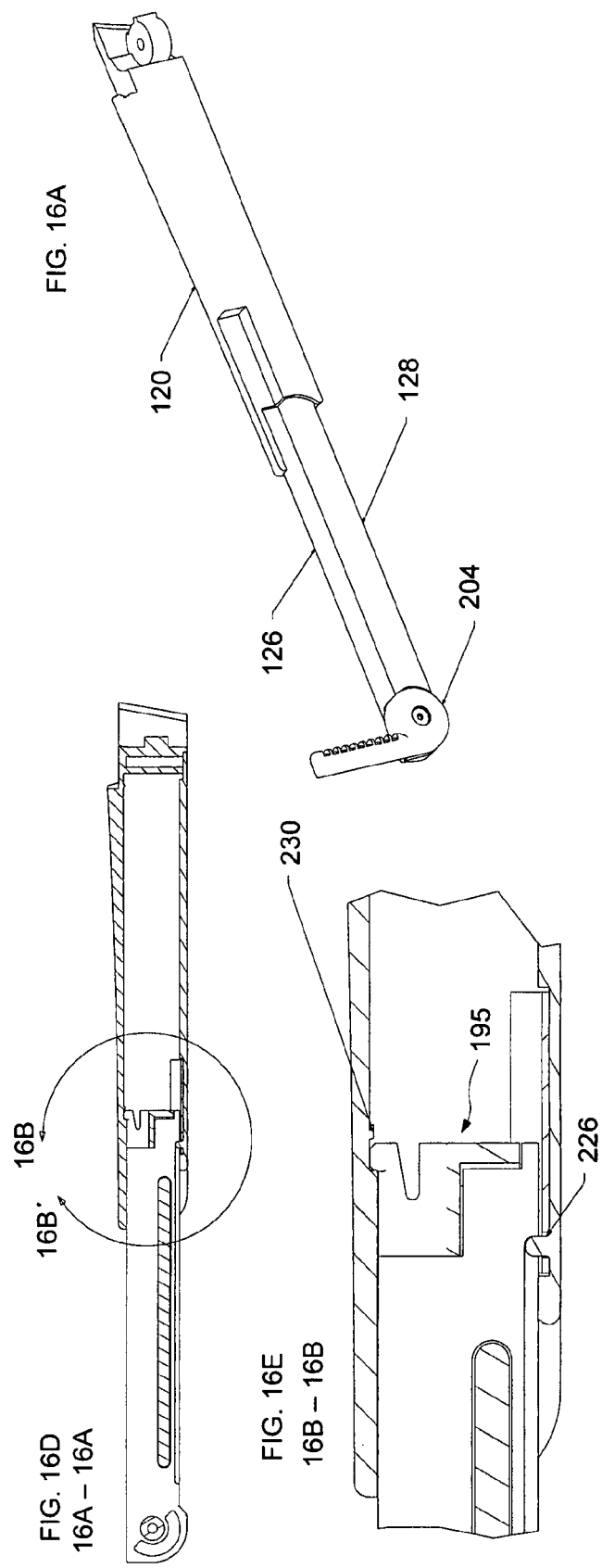

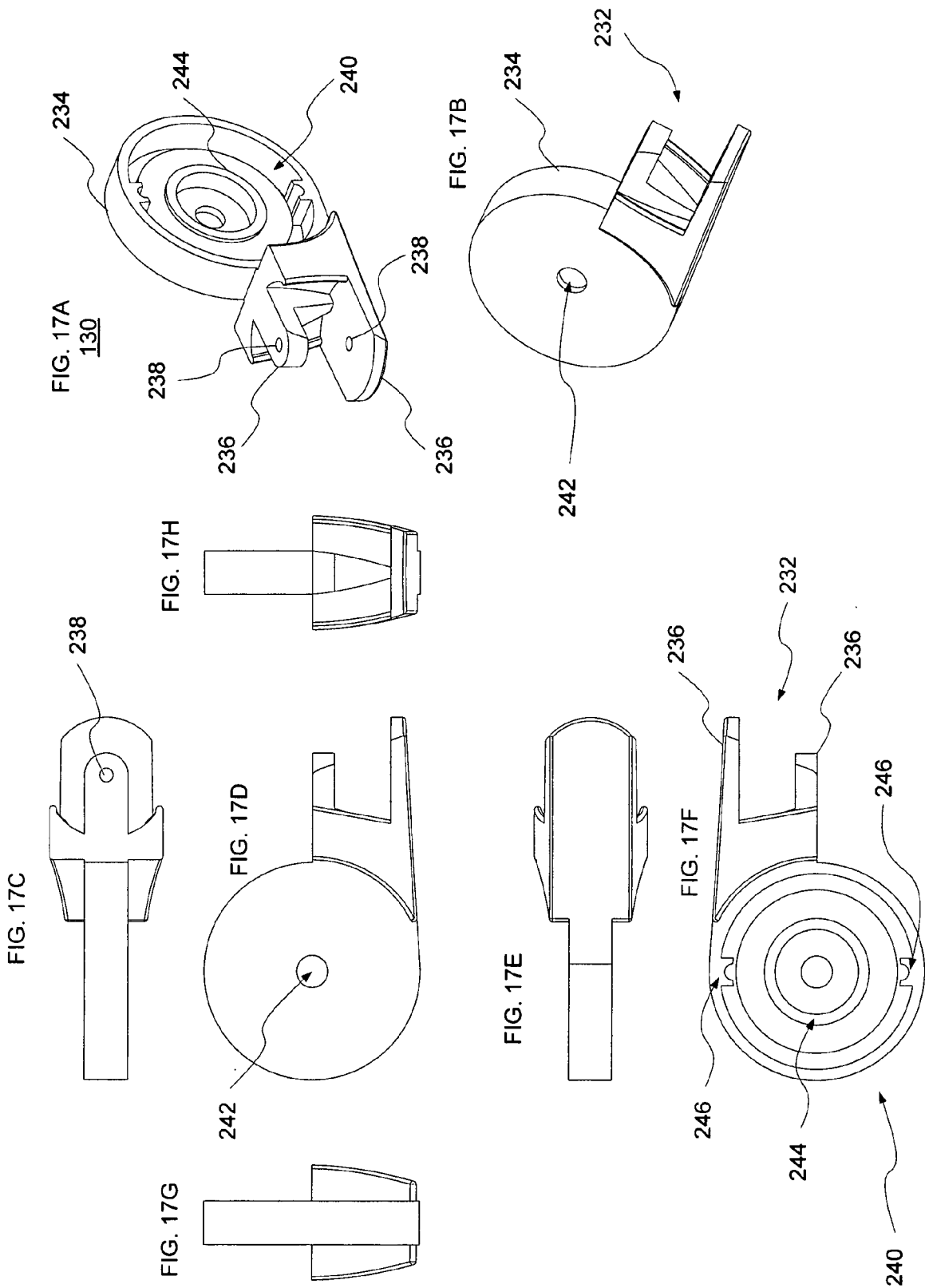

138

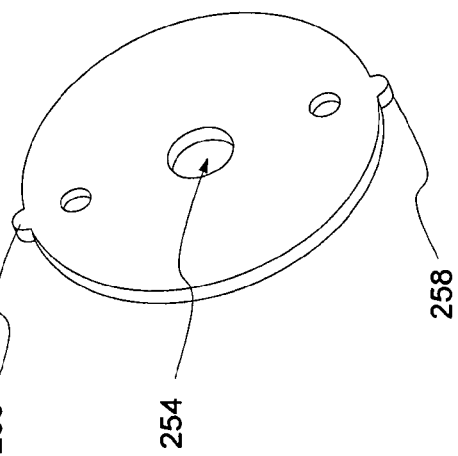
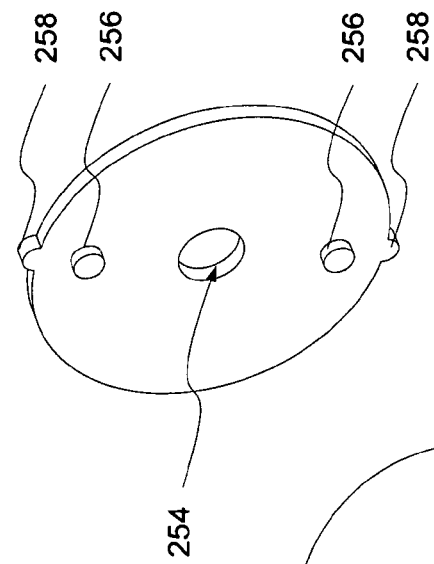
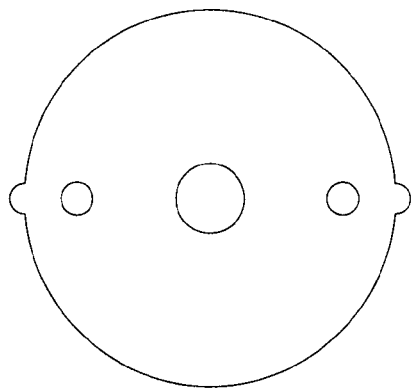
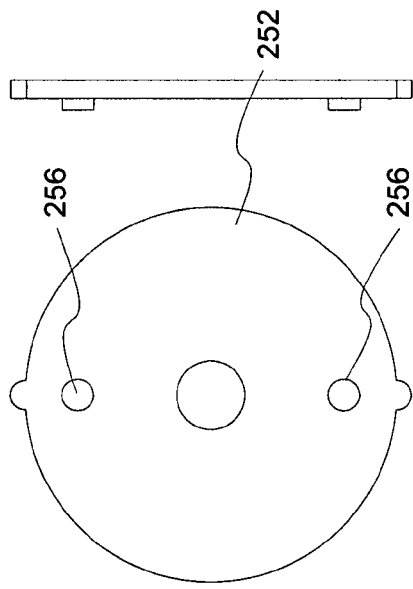
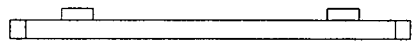

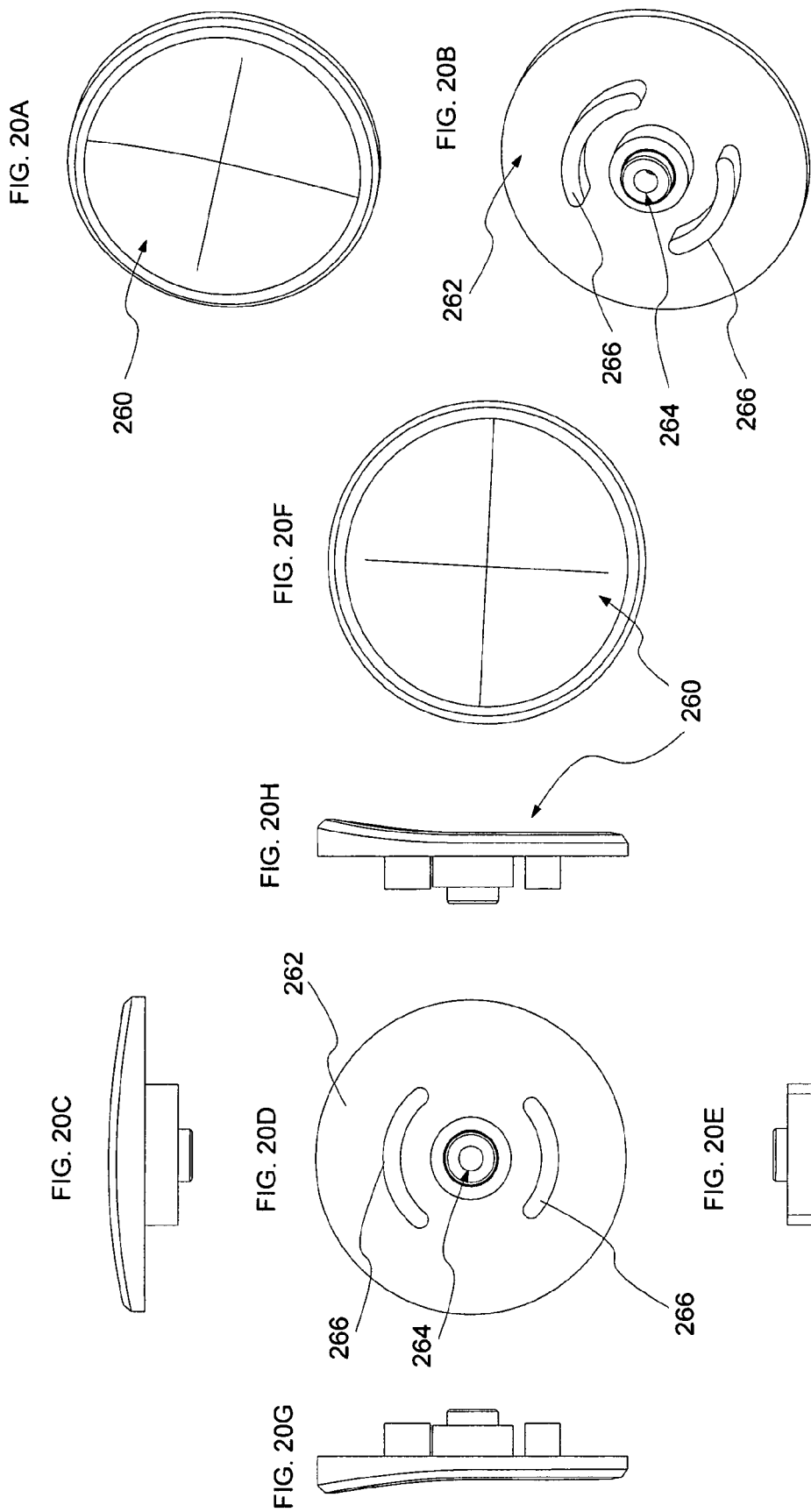

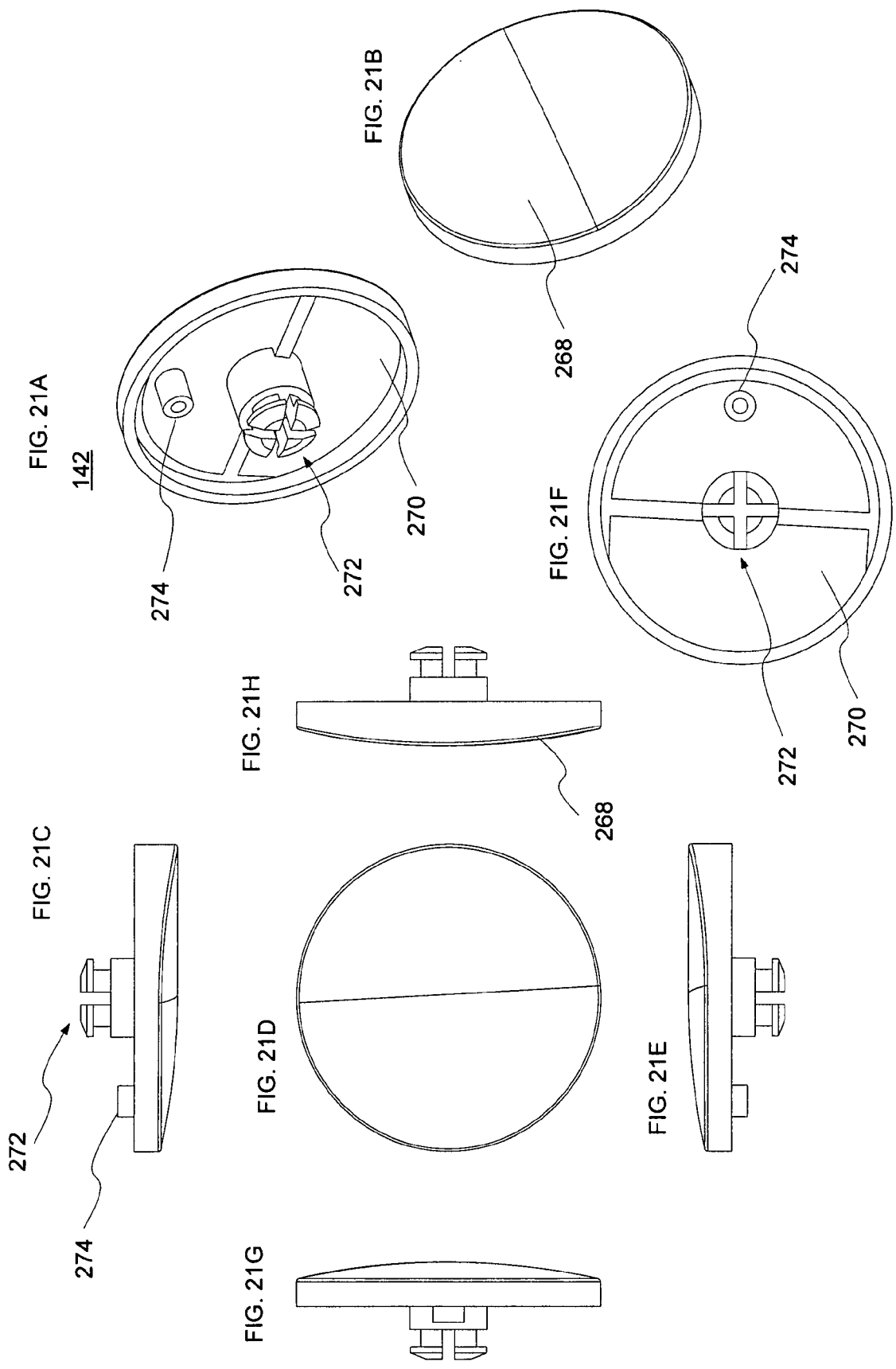

22A–22A

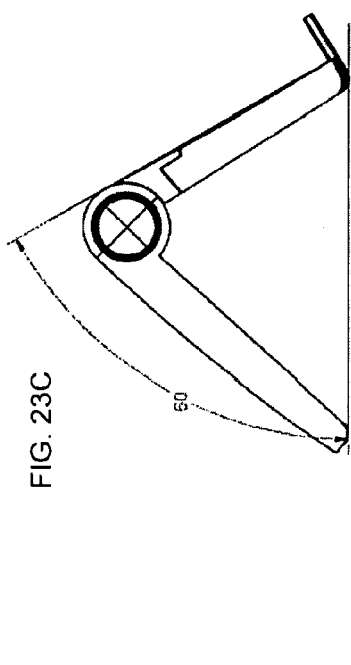
FIG. 23B
FIG. 23C
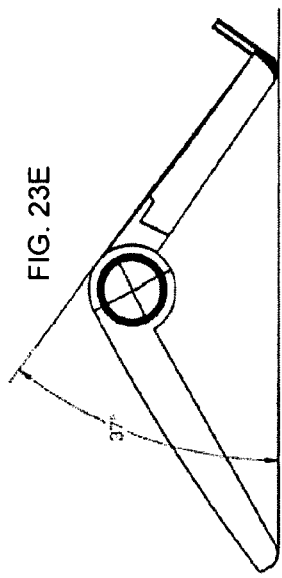
FIG. 23E
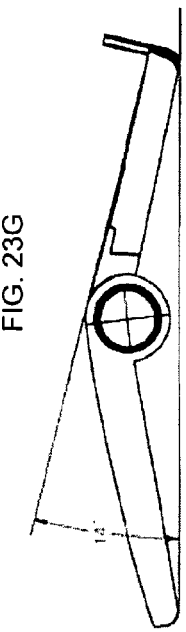
FIG. 23G
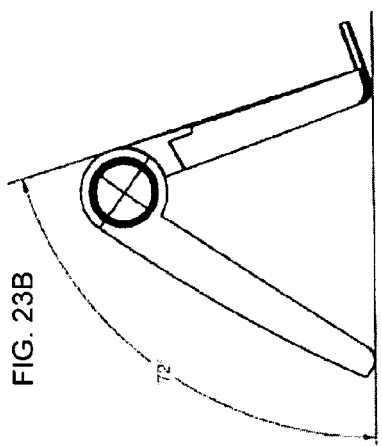
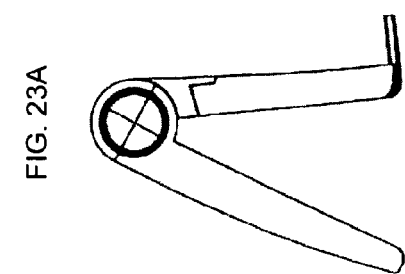
FIG. 23A
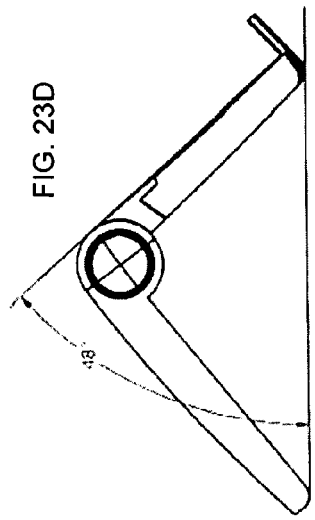
FIG. 23D
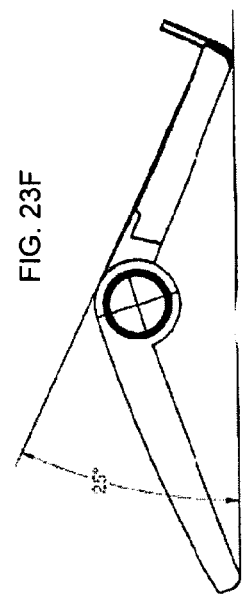
FIG. 23F

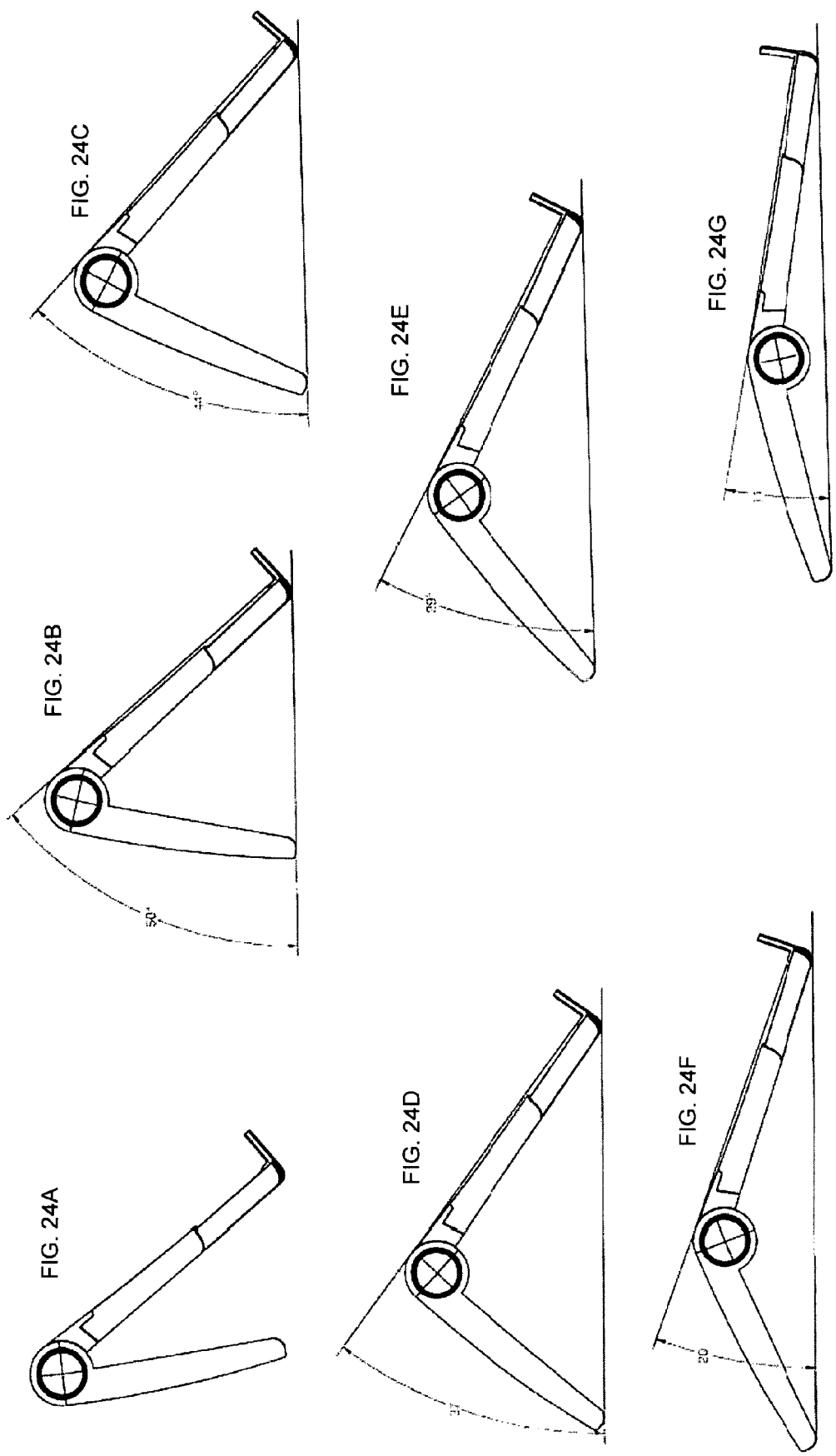

FOLDING SUPPORT STAND FOR PORTABLE ELECTRONIC DEVICES

CROSS REFERENCE TO RELATED APPLICATIONS

The present application is related to U.S. Design patent application Ser. No. 29/286,166, entitled FOLDING STAND, filed concurrently herewith, the entire disclosure of which is hereby expressly incorporated by reference herein.

BACKGROUND OF THE INVENTION

The present invention relates to a device for use in supporting and displaying electronic devices. More particularly, the present invention is particularly adapted for use as a portable support stand for use with laptop computers, tablet computers and other portable computing and entertainment devices and the like.

Laptop computers, tablet PCs and similar portable devices are often used in home and office environments, at tradeshows, offsite meetings, etc., and may be placed on a desk, table or other surface and used as a stand alone device or in conjunction with a docking station. Unfortunately, conveniences in size and portability may not be matched by proper ergonomics or convenience in the placement of such devices. For instance, when using a laptop, the keyboard should be positioned a comfortable distance from the user to avoid wrist, back and/or neck strain, but the display should be positioned at an appropriate distance and angle to avoid eye strain. These requirements may conflict, causing the user to choose between undesirable alternatives.

Therefore, it is desirable to provide solutions to ergonomics and other problems. For instance, it is possible to provide a support device for use with the laptop computer or other portable electronic device itself. The support device may take the form of an extension arm adapted for handling laptop computers. An example of an extension arm and supporting device for use with laptop computers is shown and described in U.S. Patent Publication No. 2004/0007651, entitled "Universal Support for Electronic Devices," the entire disclosure of which is fully incorporated by reference herein.

Another example of supporting apparatus for laptops and other portable electronic devices may be found in U.S. patent application Ser. No. 11/508,367, filed on Aug. 23, 2006 and entitled "Laptop Holder for Extension Arm," the entire disclosure of which is fully incorporated by reference herein. Yet another example of a laptop holder may be found in U.S. Design patent application Ser. No. 29/261,219, filed on Jun. 9, 2006 and entitled "Laptop Holder," the entire disclosure of which is fully incorporated by reference herein.

While such laptop extension arms and laptop holders are suitable for supporting laptop computers and the like, a need exists for support stands that can efficiently and stably support the user's device and while also being compact and easily portable.

SUMMARY OF THE INVENTION

In accordance with an embodiment of the present invention, a portable support stand for supporting an electronic device is provided. The stand comprises a first support leg, an adjustment member and a pair of adjustable support legs. The first support leg has an elongated body and a pivot member. The elongated body includes a first end for contacting a support surface and a second end remote from the first end. The pivot member is disposed adjacent the second end of the elongated body. The adjustment member is rotatably coupled to the pivot member of the first support leg. The pair of adjustable support legs each has a respective first leg member and a respective second leg member slideably attached to the respective first leg member thereof. Each first leg member has a first end pivotally coupled to the adjustment member, a second end remote from the first end and a receptacle disposed between the first and second ends. Each second leg member has first and second ends thereof. The second leg members is operable to move between a compact position in which the respective second leg member is substantially received within the receptacle of the respective first leg, as shown in FIGS. 15A-15E, and an extended position in which the second leg member is substantially removed from the receptacle of the respective first leg member, as shown in FIGS. 16A-16E. Furthermore, the pair of adjustable support legs is operable to jointly rotate between a closed position adjacent to the first support leg, as shown in FIGS. 4A-4H, and an open position with the second ends of the first and second leg members spaced apart from the first end of the first support leg, as shown in FIGS. 3A-3H.

In one alternative, the portable support stand further comprises a pair of stopper members that each has first and second ends. The first end of each stopper member is coupled to the second end of a respective one of the second leg members. Each stopper member is operable to move between a closed position with the second end of the stopper member adjacent the second end of the respective second leg member, as seen in FIGS. 15A-15B, and an open position with the second end of the stopper member not adjacent the second end of the respective second leg member, as seen in FIGS. 16A-16B.

In an example, the stopper members are rotatably coupled to the second ends of the respective second leg members, and the open position is substantially perpendicular to the closed position. In another example, the stopper members and the adjustment member each include a point of contact for supporting the electronic device at three points. In a further example, each stopper member includes means for producing an audible indicator to identify that the respective stopper member is in the open or closed position.

In another alternative, the pivot member includes a first engagement member and the adjustment member includes a second engagement member adjustably coupled to the first engagement member to lock the adjustable support legs in the closed position and in the open position, and to permit movement of the adjustable support legs between the closed and open positions. In one example, the first engagement member includes a plurality of connectors and the second engagement member includes at least one connection member operable to couple with a first one of the plurality of connectors in the closed position and with a second one of the plurality of connectors in the open position. In another example, the support stand further comprises a spring device disposed between the first and second engagement members.

In a further alternative, each of the adjustable support legs includes means for producing an audible indicator to identify when the respective adjustable support leg is in the compact or extended position.

In accordance with another embodiment of the present invention, a portable support stand for supporting an electronic device is provided. The stand comprises a first support leg, a pair of adjustable support legs and an adjustment member. The first support leg has an elongated body including a first end for contacting a support surface and a second end remote from the first end. The adjustment member rotatably couples the pair of adjustable support legs to the second end of the first support leg. The adjustment member includes a first engagement member, a pivot device, a second engagement member, a spring device and an adjustment actuator. The first engagement member is coupled to the first support leg. The engagement member has a first surface including plurality of first connection members distributed about a central rotation point and at least one second connection member disposed in the first surface. The pivot device includes a first section adjustably coupled to the engagement member and a second section adjustably coupled to both first leg members. The second engagement member includes at least one connection member operable to releasably engage at least one of the first connection members of the first engagement member. The spring device is substantially disposed between the pivot device and the second engagement device. The adjustment actuator is coupled to the second engagement device. In operation, when the adjustment actuator is in a first state, the at least one connection member of the second engagement member is securely coupled to at least one of the first connection members of the first engagement member. And when the adjustment actuator is in a second state, the at least one connection member of the second engagement member is decoupled from the at least one first connection member so that the pair of adjustable support legs is moveable between a closed position adjacent to the first support leg and an open position with the second ends of the first and second leg members spaced apart from the first end of the first support leg.

In one alternative, the pair of adjustable support legs each includes a first leg member and a second leg member slideably coupled to the respective first leg member thereof. The first support leg preferably has a fixed length.

In another alternative, the plurality of first connection members is desirably distributed in a circular arrangement about the central rotation point. In this case, the plurality of first connection members are most preferably receptacles, and the at least one connection member comprises at least one projection operable to releasably engage at least one respective connection members.

In a further alternative, the portable support stand additionally comprising at least one magnet received in the first support leg for magnetically securing the pair of adjustable support legs to the first support leg in the closed position.

In yet another alternative, the portable support stand further comprises a pair of stopper members. Here, a first one of the stopper members is coupled to a first one of the adjustable support legs and a second one of the stopper members is coupled to a second one of the adjustable support legs. The pair of stopper members is moveable between a compact position when the support stand is in the closed position and an extended position when the support stand is in the open position.

In one example, the electronic device is operable to rest on the support stand at three points when the support stand is in the open position. Here, the pair of stopper members each provide a first point of contact for the electronic device and the first support leg provides a second point of contact for the electronic device in a tripod arrangement.

In another example, when the stand is in the open position it has a double tripod configuration for supporting the electronic device and for contacting the support surface. Most preferably, in the double tripod configuration the first end of the first support leg provides a first point of contact with the support surface and the pair of stopper members each providing separate second points of contact with the support surface. And the second end of the first support leg providing a first point of contact for the user device and the pair of stopper members each provide separate second points of contact for the user device.

In accordance with a further embodiment of the present invention, a portable support stand for use with an electronic device comprises a first support leg, a pair of adjustable support leg and an adjusting means. The first support leg has an elongated body including a first end for contacting a support surface and a second end remote from the first end. The pair of adjustable support legs each has a first leg member and a second leg member slideably attached to the respective first leg member thereof. The adjusting means is for adjusting a position of the pair of adjustable support legs relative to the first support leg so that the portable support stand is configured in either a closed position or an open position. Furthermore, in the open position the support stand has a double tripod configuration for supporting the electronic device and for contacting the support surface.

BRIEF DESCRIPTION OF THE DRAWINGS

FIGS. 1A-1F illustrate a stand device supporting a laptop computer in accordance with aspects of the present invention.

FIGS. 3A-3H illustrate a portable stand in accordance with aspects of the present invention.

FIGS. 4A-4H illustrate the portable stand of FIGS. 3A-3F in a compact configuration in accordance with aspects of the present invention.

FIGS. 6A-6H illustrate a first section of the portable stand of FIG. 5 in accordance with aspects of the present invention.

FIGS. 7A-7H illustrate a second section of the portable stand of FIG. 5 in accordance with aspects of the present invention.

FIGS. 9A-9H illustrate a portion of a front leg of the stand in FIG. 5 in accordance with aspects of the present invention.

FIGS. 10A-10H illustrate a second portion of the front leg of the stand in FIG. 5 in accordance with aspects of the present invention.

FIGS. 11A-11P illustrate a third portion of the front leg of the stand in FIG. 5 in accordance with aspects of the present invention.

FIGS. 12A-12P illustrate a fourth portion of the front leg of the stand in FIG. 5 in accordance with aspects of the present invention.

FIGS. 13A-13H illustrate a stopper for use with the front legs of the stand in accordance with aspects of the present invention.

FIGS. 15A-15E illustrate a front leg assembly in a compact position in accordance with aspects of the present invention.

FIGS. 16A-16E illustrate the front leg assembly of FIGS. 15A-15E in an extended position in accordance with aspects of the present invention.

FIGS. 17A-17H illustrate a portion of a pivot device in accordance with aspects of the present invention.

FIGS. 19A-19H illustrate an engagement member in accordance with aspects of the present invention.

FIGS. 20A-20H illustrate an actuator in accordance with aspects of the present invention.

FIGS. 21A-21H illustrate a cover in accordance with aspects of the present invention.

FIGS. 23A-23G illustrate exemplary compact positioning of a stand in accordance with aspects of the present invention.

FIGS. 24A-24G illustrate exemplary extended positioning of a stand in accordance with aspects of the present invention.

DETAILED DESCRIPTION

The aspects, features and advantages of the present invention will be appreciated when considered with reference to the following description of preferred embodiments and accompanying figures. In describing the preferred embodiments of the invention illustrated in the figures, specific terminology will be used for the sake of clarity. However, the invention is not intended to be limited to the specific terms so selected, and it is to be understood that each term selected includes all technical equivalents that operate in a similar manner to accomplish a similar purpose.

As mentioned above, the present invention provides a portable support platform or stand that is suitable for use with laptop computers, tablet computers and other portable equipment. FIGS. 1A-1F illustrate a laptop computer 10 that is supported by a stand 100. FIGS. 2A-2F illustrate the stand 100 supporting a tablet style personal computer ("tablet PC") 20. As can be seen in the various views of FIGS. 1 and 2, the stand 100 has a tripod-type configuration, which, as will be explained in more detail below, may be placed on many different surfaces in a wide variety of orientations and positions. This gives the user supreme flexibility in placing his or her laptop computer, tablet PC or other device in the exact arrangement desired. While the laptop computer 10 and tablet PC 20 are exemplary, the stand 100 may support portable devices of many different types and configurations, including but not limited to PDAs, personal stereos, pictures, etc.

FIGS. 3A-3H illustrate the stand 100 in detail. As seen in the front and rear perspective views of FIGS. 3A and 3B, the stand 100 includes a pair of front legs 102 and 104 that are coupled to a rear leg 106. The front legs 102 and 104 are preferably adjustable to varying lengths, which enables the stand 100 to accommodate devices of varying sizes and shapes. Furthermore, the front legs 102 and 104 may be adjusted independently of one another, which is particularly helpful when positioning the laptop or tablet PC on an uneven surface.

Figure 1E:
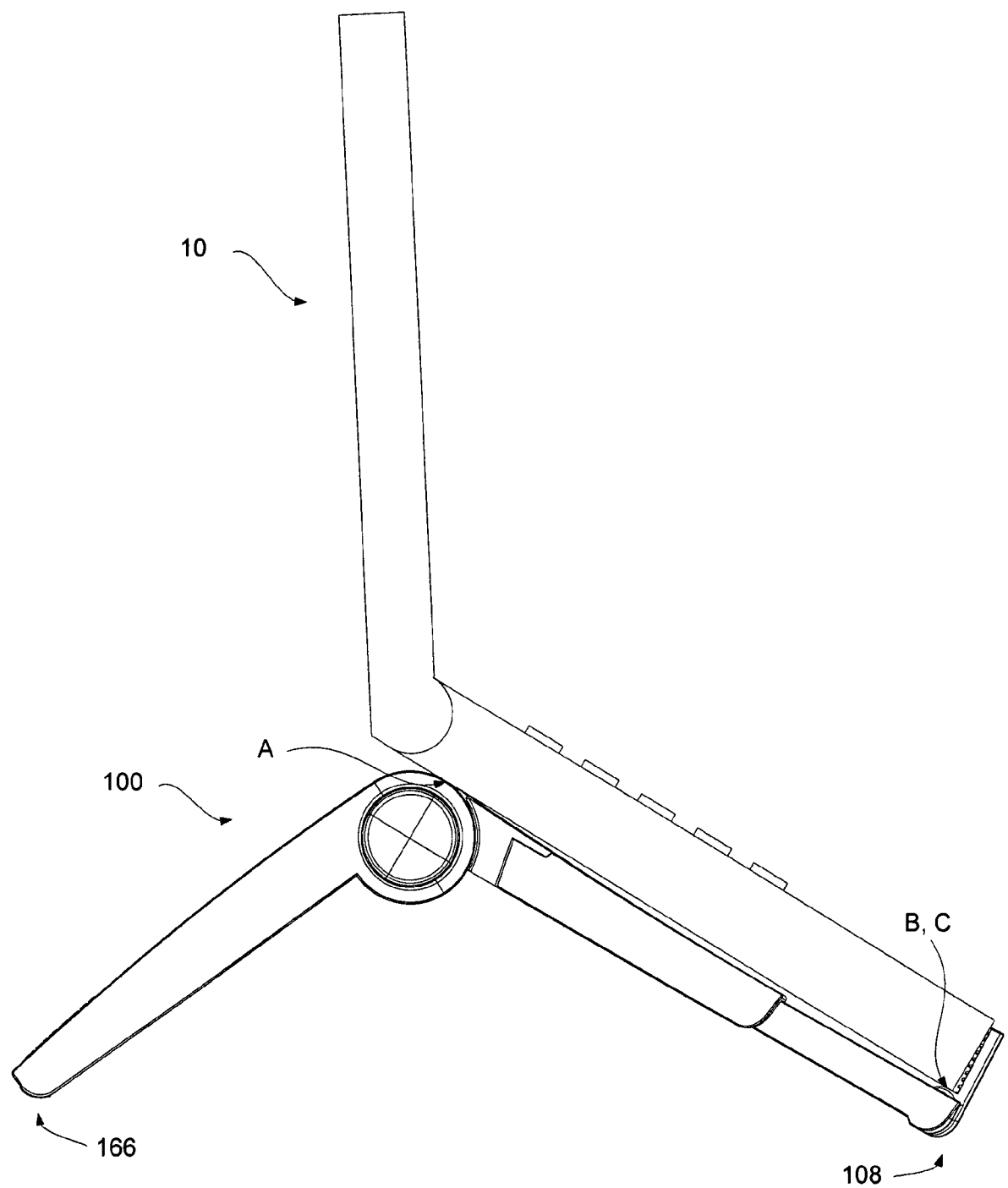
Figure 2C:
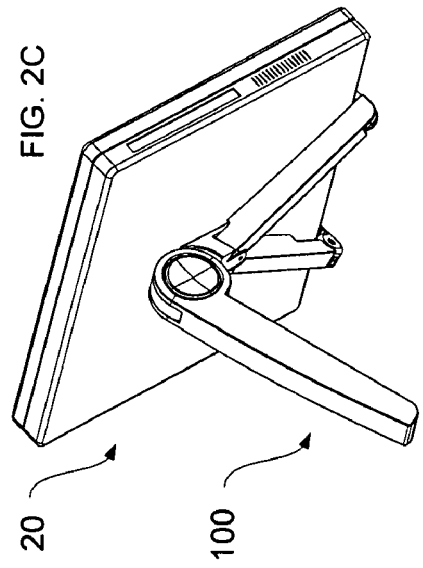
FIGS. 2A-2F illustrate the stand device of FIGS. 1A-1F supporting a tablet PC in accordance with aspects of the present invention.
Figure 2F:
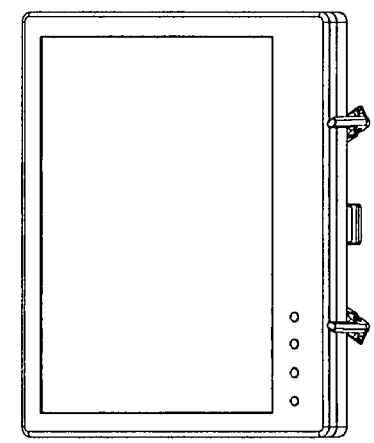
Figure 2B:
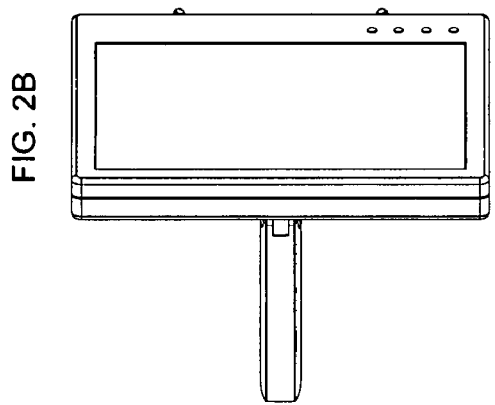
Figure 2E:
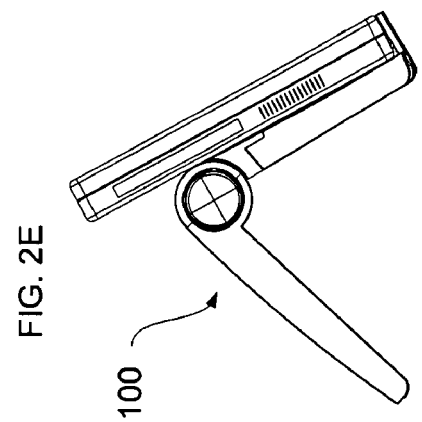
Figure 2A:
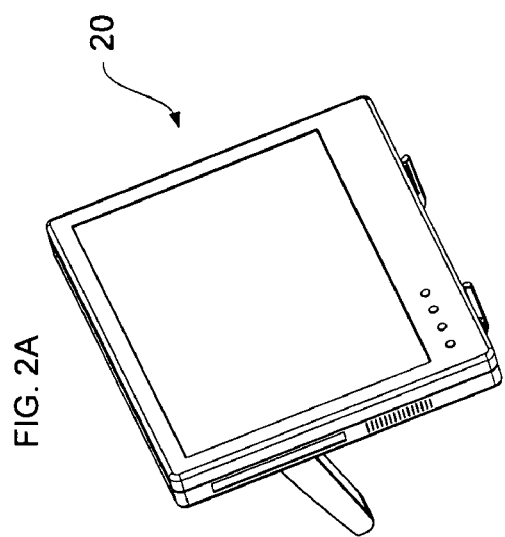
Figure 2D:
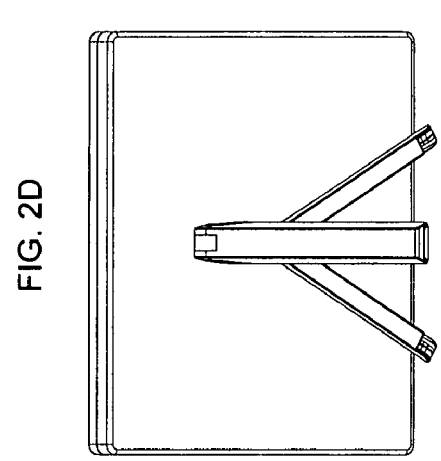
Figure 3C:
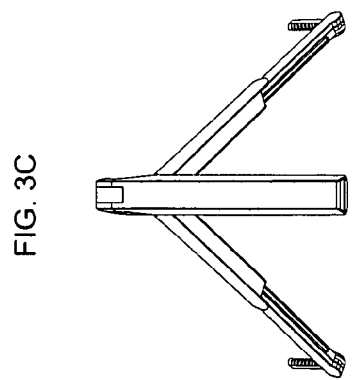
Figure 3G:
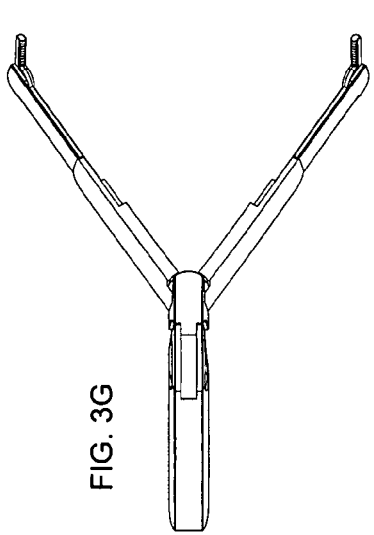
Figure 3E:
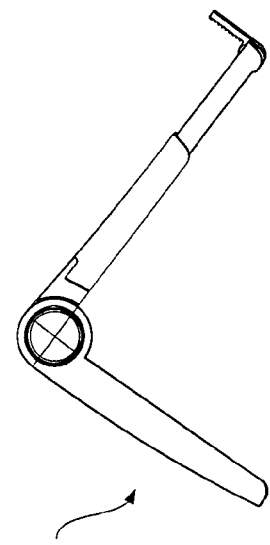
Figure 3H:
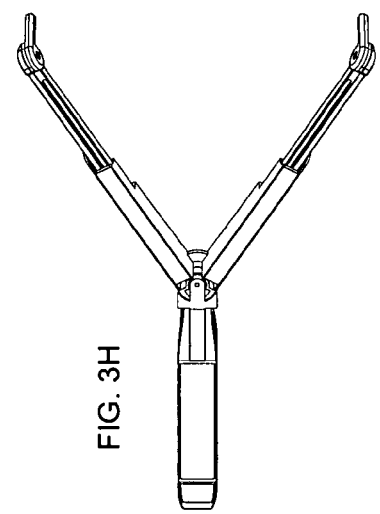
Figure 3D:
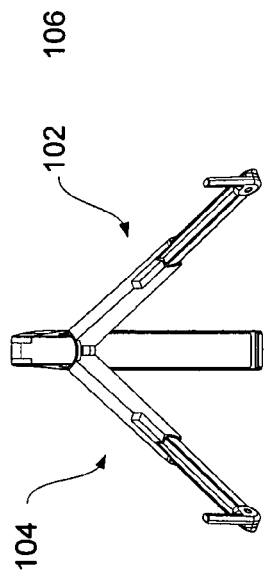
Figure 3F:
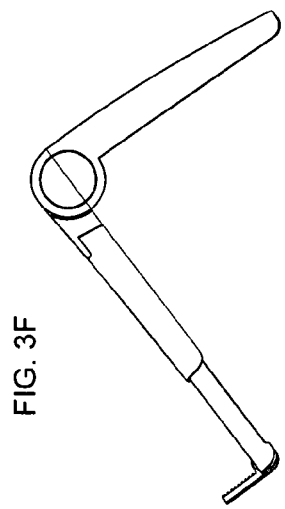

As shown in the views of FIGS. 3A-3H, the front legs 102 and 104 preferably include a pair of stoppers 108a,b. The stoppers 108a,b help support the user device and prevent it from slipping off of the legs 102 and 104. Preferably, the legs 102 and 104 have a bowed or curved upper surface. In this case, the laptop 10, tablet PC 20 or other portable device will rest on the stand at three points, namely points A, B and C as shown in FIG. 3A and FIG. 1E. In addition to the overall open architecture, this bowed/curved tripod-type configuration promotes air circulation and cooling for the user device. Furthermore, by contacting the stand 100 at only three locations, this gives additional stability to the user device. This may be especially important for table PC-type devices or laptops where the user is writing on or typing on the device, where a wobbly device is especially undesirable.

Also shown in these figures is a pivot section 110, which enables the legs 102 and 104 to rotatably move relative to the leg 106 from the "open" configuration shown to a "closed" configuration as illustrated in FIGS. 4A-4H. In the closed configuration, it can be seen that the front legs 102 and 104 are placed in a compact parallel orientation as opposed to the extended angled configuration of FIGS. 3A-3H. Furthermore, the legs 102 and 104 may be placed in parallel orientation with the leg 106 as well. Thus, in this arrangement, the stand 100 is not only compact, but is easily portable by the user. This makes the stand 100 very beneficial for people who are on the go and need a portable stand for their laptop or tablet PC which can be folded away when traveling or when it is otherwise not being used.

It can be seen in FIGS. 3 and 4 that the legs are moveable along two general paths or planes. In the first path, the front legs 102 and 104 are moveable relative to the rear leg. In the second path or plane, the front legs 102 and 104 are also moveable relative to one another. Thus, the user may carry the stand 100 in a compact configuration with all three legs together, and may then open up the stand 100 so that the legs are positioned in a tripod configuration.

Figure 5:
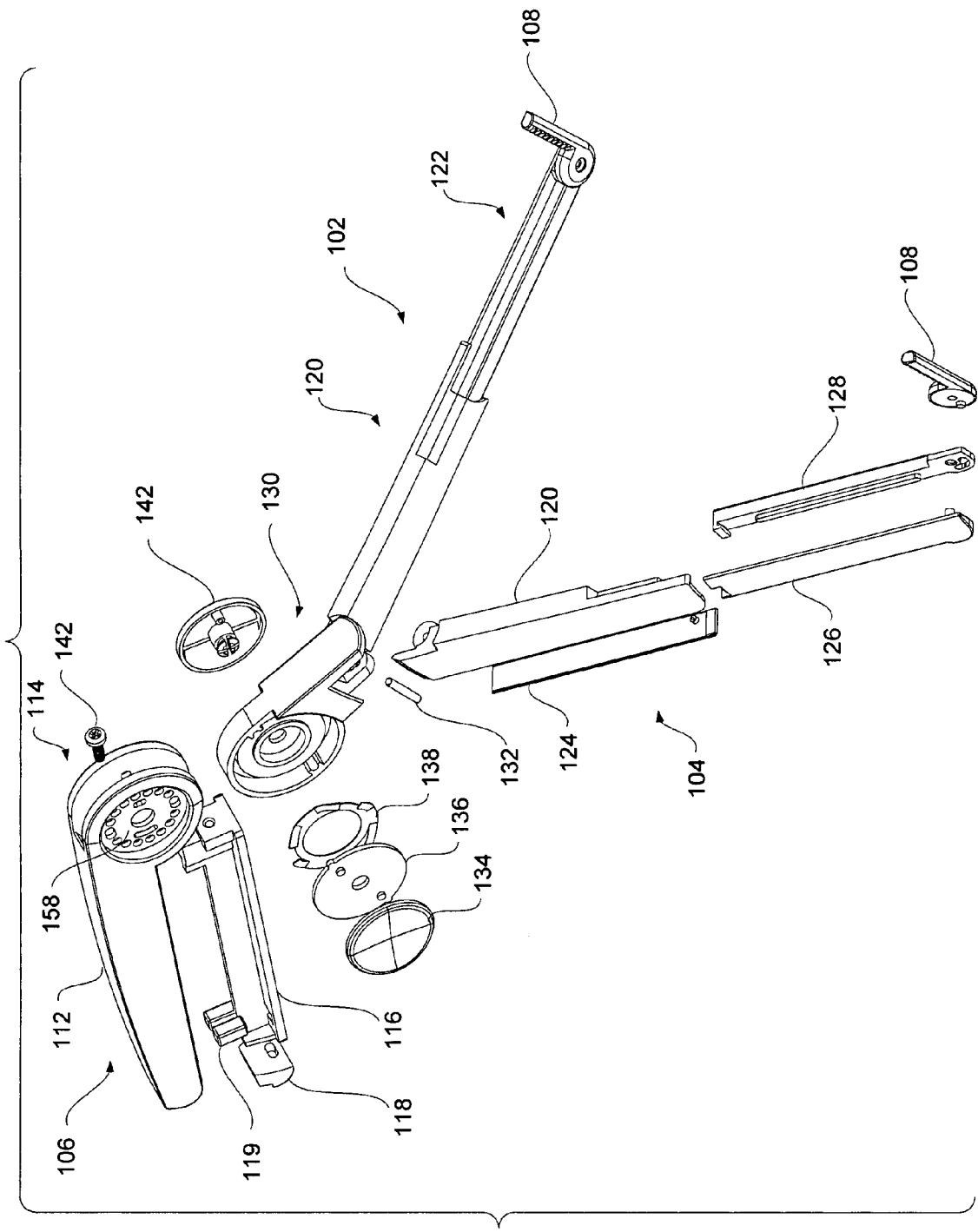
FIG. 5 illustrates an exploded view of the portable stand of FIGS. 3A-3F in accordance with aspects of the present invention.
Figure 8B:
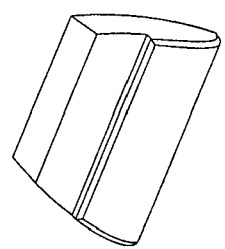
FIGS. 8A-8H illustrate a grip member of the stand of FIG. 5 in accordance with aspects of the present invention.
Figure 8A:
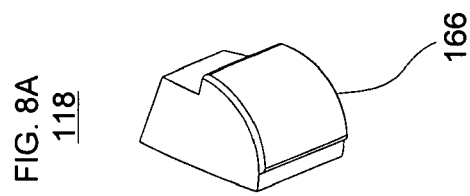
Figure 8H:
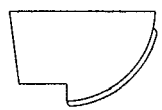
Figure 8E:
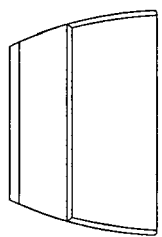
Figure 8G:
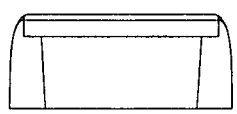
Figure 8D:
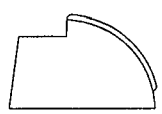
Figure 8F:
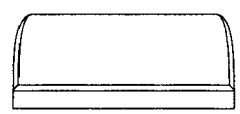
Figure 8C:
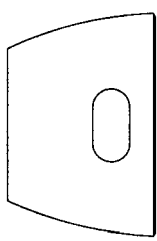

FIG. 5 is an exploded view of the stand 100 in order to better illustrate various aspects of the stand. As seen in this figure, the legs 102, 104 and 106, as well as the pivot section 110, may be formed from a number of discrete components. For example, the rear leg 106 may comprise a main body portion 112 and a pivot member 114. The pivot member 114 may be integrally formed with the main body portion 112 or may be fabricated separately and connected to the main body portion 112. The leg 106 may also include one or both of a support member 116 and a grip member 118.

While not required, one or more magnets 119 may also be incorporated into the rear leg 106. The magnet(s) 119 may be used to help secure the leg 106 to the legs 102 and 104 when the stand 100 is in a closed or folded up (compact) arrangement. Preferably, at least a portion of the legs 102 and 104 are metallic or magnetic. Thus, when the stand 100 is closed, for example for travel, the magnet 119 magnetically holds the legs 102 and 104 to the leg 106. The magnet 119 need only be strong enough to hold the legs together without making it difficult for the user to detach the legs 102 and 104 from the leg 106. Furthermore, when the legs are drawn together, they provide a pleasing sound, letting the user know the legs are full closed together.

The legs 102 and 104 are preferably substantially mirror images of one another and are configured for easy adjustment by the user. For example, each leg 102 and 104 desirably includes an upper leg portion 120 and an adjustable lower leg portion 122. The upper leg portion 120 may include a cover section 124. The lower leg portion 122 preferably includes a sliding member 126 and a slide stopping member 128. The stoppers 108a,b are preferably coupled to one or both of the sliding member 126 and to the slide stopping member 128.

The pivot section 110 preferably includes a central pivot 130. The upper leg portions 120 are desirably adjustably coupled to the central pivot 130 by an adjustment mechanism such as pivot pin 132. The pivot section 110 may also include an adjustment actuator such as push button 134, an engagement member 136 and a spring device 138. A fastener (not shown) and a cap 142 may also comprise part of the pivot section 110.

Each of these components is illustrated in detail in the accompanying figures. For instance, FIGS. 6A-6H illustrate the main body portion 112 and pivot member 114 of the rear leg 106. As best seen in the perspective view of FIG. 6A and the front view of FIG. 6D, the main body portion 112 may include a cavity 144 formed generally by sidewalls 146a,b and rear wall 148. The cavity 144 may include one or more receptacles 150 adapted to receive the magnets 119. The magnets 119 are preferably employed to secure the legs 102 and 104 to the leg 106 when the stand 100 is in the fully closed position.

The pivot member 114 preferably includes an opening or receptacle 152 adapted to receive fastener 154 (see FIG. 5). The fastener 154 may be, for instance, a screw which may threadedly engage the opening 152 and a threaded opening 156 in the support member 116 (see FIGS. 7A and 7C) to secure the support member 116 to the main body portion 112 of the rear leg 106. The pivot member 114 also desirably includes a pair of "arms" or extensions 157, which extend away from the main body portion 112 as shown in FIGS. 6C and 6D.

As best seen in FIGS. 6A, 6B and 6E, the pivot member 114 preferably also includes an engagement member 158. The engagement member 158 is preferably attached to or integrated with one of the extensions 157. As part of the pivot section 110, the engagement member 158 permits adjustment of the legs 102 and 104 relative to the rear leg 106, as will be described in more detail below. The engagement member 158 is desirably circular in configuration, and may include a central opening 160 and a series of openings 162 distributed around the central opening. One or more elongated openings 163 may also be disposed along the engagement member 158 between the central opening 160 and the openings 162. The other one of the extensions 157 preferably also includes a central opening 164 and an offset opening 165, as shown in FIG. 6F. The central opening 164 should be aligned with the central opening 160.

FIGS. 7A-7H illustrate the support member 116 in detail. As discussed above, the support member 116 preferably includes a threaded opening 156 so that the support member 116 may be secured to the main body portion 112 using a fastener. Other types of fasteners or connectors may be employed in lieu of a threaded screw. Alternatively, the support member 116 may be integrally molded or otherwise fabricated with the main body portion 112 to provide a unitary leg 106. A central support 159 may extend longitudinally span the support member 116.

FIGS. 8A-8H illustrate the grip member 118 in various orientations. The grip member 118 may be formed of rubber, plastic or other slip-resistant material. The grip member 118 is preferably attached to the end of the leg 106, for instance to the support member 116, to the main body portion 112, or to both. The configuration of the grip member 118 desirably includes a rounded surface 166 for contacting the support surface such as a desktop, although other configurations are possible. Alternatively, the member 118 may be replaced with another member having a non-gripping surface. This may be suitable for situations where it is desirable to move or reposition the stand 100 on a support surface.

In addition to the surface 166 of member 118, the other two points of contact for the stand 100 on the support surface are preferably the stoppers 108, as shown in the side view of FIG. 1E. As with the member 118, the stoppers 108 may include a gripping surface or a non-gripping surface. Preferably all three points of contact have either a gripping surface or a non-gripping surface. Thus, as seen in this figure, the stoppers 108 desirably provide two of the three resting points for the laptop 10, tablet PC 20 or other portable device, and also desirably provide two of the three support points when the stand 100 contacts a support surface. Furthermore, one end of the rear leg 106, such as at point A, preferably provides the third resting point for the user device with the other end of the rear leg 106, such as at surface 166, preferably provides the third support point when the stand 100 rests on a support surface. Thus, it can be seen that the stand 100 preferably provides a "double tripod" configuration in which the stand rests on three points when placed on a support surface and also provides three points on which the user device rests. This double tripod arrangement is maintained no matter what specific placement is used to support the user device, as shown in the examples of FIGS. 1-2 and 23-24.

The legs 102 and 104, as explained above, may include a number of components, including an upper leg portion 120 and an adjustable lower leg portion 122. The upper leg portion 120 is illustrated in FIGS. 9A-9H, and the cover section 124 is illustrated in FIGS. 10A-10H. As the legs 102 and 104 are preferably substantially mirror images of one another, only the right leg components are illustrated in these figures.

For instance, as seen in the perspective views of FIGS. 9A and 9B, the upper leg portion 120 includes an elongated section 168 and a pivot section 170 adjacent thereto. The elongated section 168 preferably includes an opening 172 and a receptacle 174 that receive the adjustable lower leg portion 122. Disposed on a side wall of the elongated section 168 is a connection point 176 adapted to receive a corresponding connection member 178 on the cover section 124, which is shown in FIGS. 10A and 10D. While the elongated section 168 and the cover section 124 are shown as being separate components, it is possible to fabricate the upper leg portion 120 as a single, integral component.

As shown in FIGS. 9A-9C and 9E, the pivot section includes a receptacle 180, which is adapted to receive the pivot pin 132. Thus, when the leg 102 or 104 is connected to the central pivot 130, the upper leg portion 120 is operable to pivot about the axis of the pivot pin 132.

The lower leg portion 122, in particular the sliding member 126 and the slide stopping member 128, is illustrated in FIGS. 11 and 12. In the embodiment shown in FIGS. 11A-11H, the sliding member 126 preferably includes an elongated slot 182 along the body of the sliding member, a pivot member 184 adjacent a first end of the sliding member, and a recess 186 adjacent a second end of the sliding member.

FIGS. 11I-11P illustrate an alternative embodiment of the sliding member 126, namely sliding member 126'. The main differences between sliding member 126' and sliding member 126 are the addition of a generally arcuate receptacle 185 adjacent a boss or pivot member 206, as well a notch or cutout 187 adjacent the recess 186 at the second end of the sliding member.

In the embodiment shown in FIGS. 12A-12H, The slide stopping member 128 preferably includes an elongated tab member 188 adapted to fit the elongated slot 182 of the sliding member 126. An opening 190 is configured to receive the pivot member 184, and a tab member 192 is adapted to connect to the recess 186. The slide stopping member 128 preferably also includes a receptacle 194 for use with stopper 108.

FIGS. 12I-12P illustrate an alternative embodiment of the stopping member 128, namely stopping member 128'. Here, the stopping member 128' includes a spring member 195. The spring member 195 is preferably disposed at the end of the slide stopping member 128 opposite the end having the opening 190 and the receptacle 194. More preferably, the spring member 195 is desirably an extension of or adjacent to the tab member 192. A protrusion 208 and a spring member 210 are preferably also included as part of the stopping member 128'.

The protrusion 208 and spring member 210 are used in conjunction with the stopper, as will be described in more detail below with regard to FIGS. 14A-14D. The spring member 195 is used when sliding the lower leg portion 122' in and out of the upper leg portion 120, as will be described in more detail below with regard to FIGS. 15A-15E.

While the sliding member 126 or 126' and the slide stopping member 128 or 128' are shown as being separate components, it is possible to fabricate the lower leg portion 122 as a single, integral component. Furthermore, while only right lower leg components are shown, the left lower leg components are substantially identical in configuration.

FIGS. 13A-H illustrate the stopper 108 for use with the right leg including sliding member 126 and stopping member 128, with the stopper 108 for use with the left leg being a mirror image of the right. As best seen in the perspective view of FIG. 13A and the rear view of FIG. 13D, the stopper 108 preferably includes a gripping or friction surface 196 along leg 198, as well as a through hole 200 and a protrusion 202 on pivot section 204.

The through hole 200 receives the pivot member 184 and may be secured thereto by a fastener such as a threaded screw or bolt. The protrusion 202 is received by the receptacle 194. The stopper 108 may be adjusted between a closed position, for instance when the stand 100 is folded up, and an open position, for instance when the stand 100 is ready for use. The range of motion of the leg 198 depends upon the track provided by the receptacle 194 for the protrusion 202. Thus, the leg may be configured to range, for example, along a 90° path between the open and closed positions. Other path ranges may be employed, by way of example only between 45° and 135°. Wider or narrower ranges may also be employed.

Figure 14B:
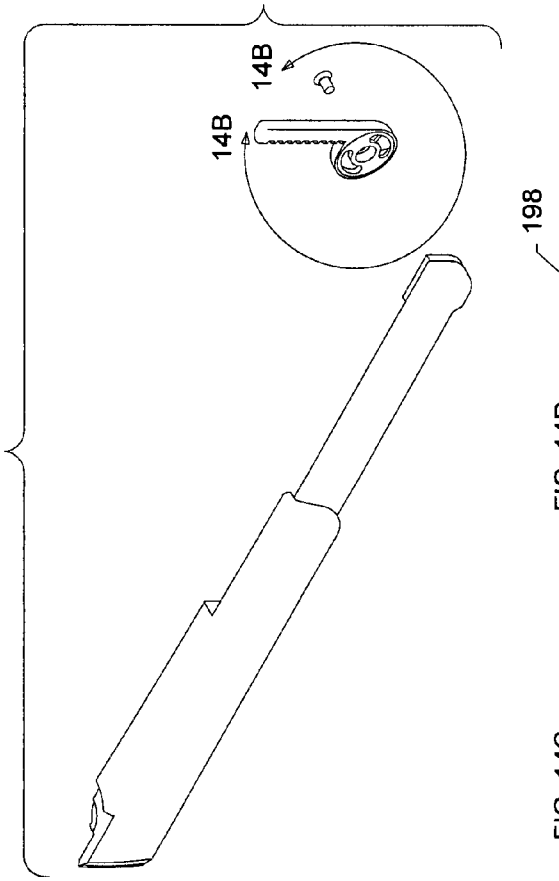
FIGS. 14A-14D illustrate a lower leg assembly in accordance with aspects of the present invention.
Figure 14D:
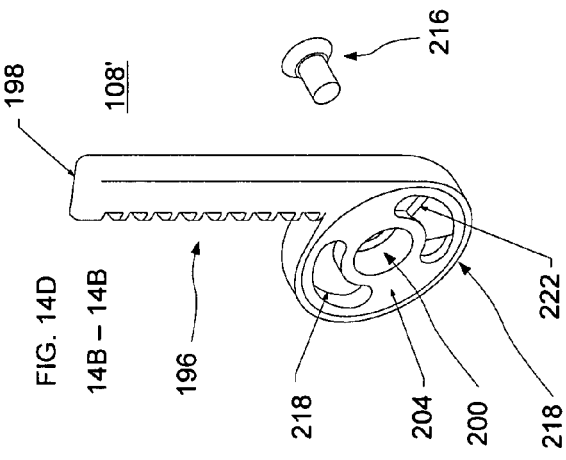
Figure 14C:
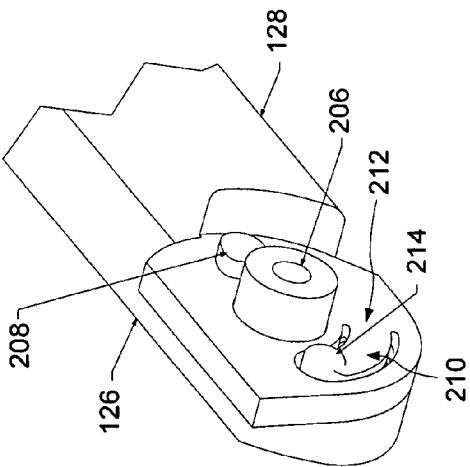
Figure 14A:
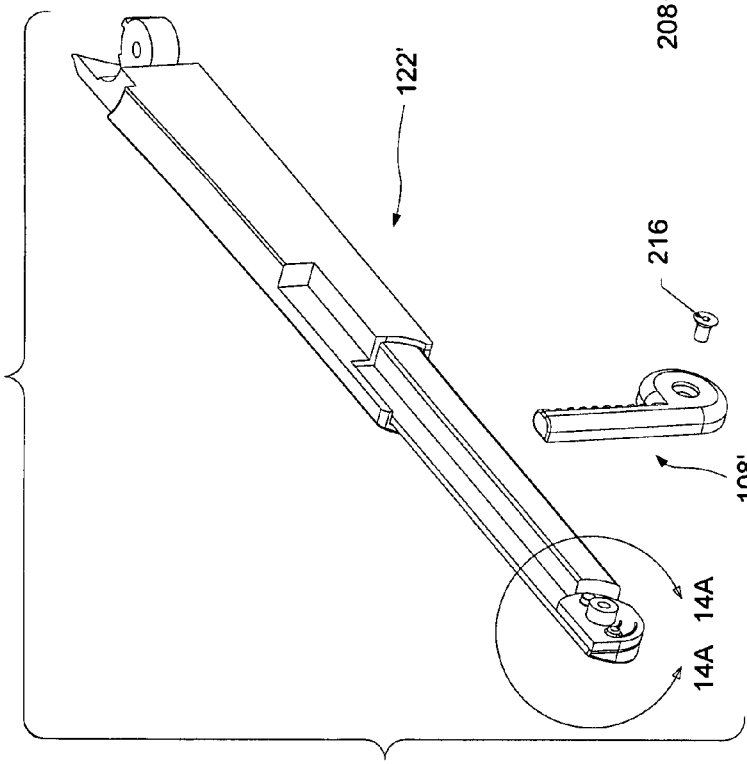
Figure 18A:
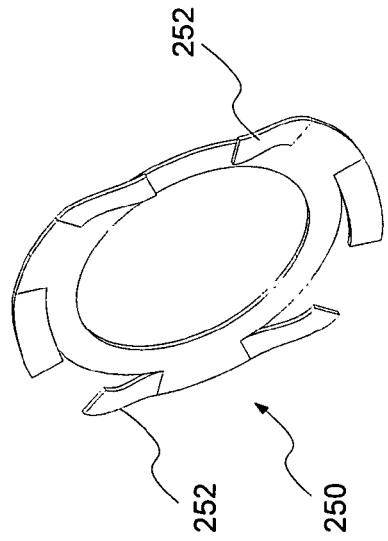
FIGS. 18A-18H illustrate a spring device in accordance with aspects of the present invention.
Figure 18B:
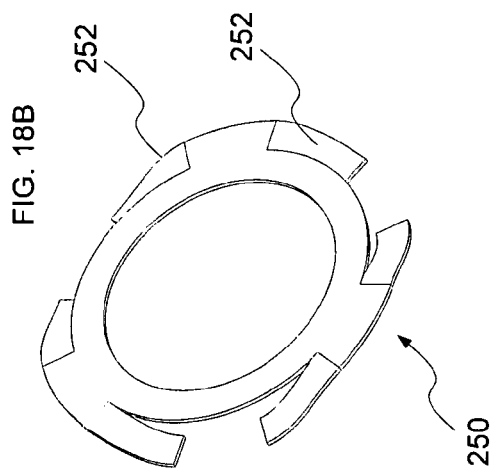
Figure 18C:
Figure 18H:
Figure 18D:
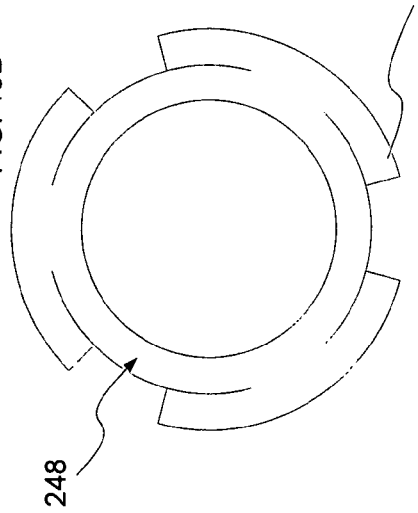
Figure 18E:
Figure 18F:
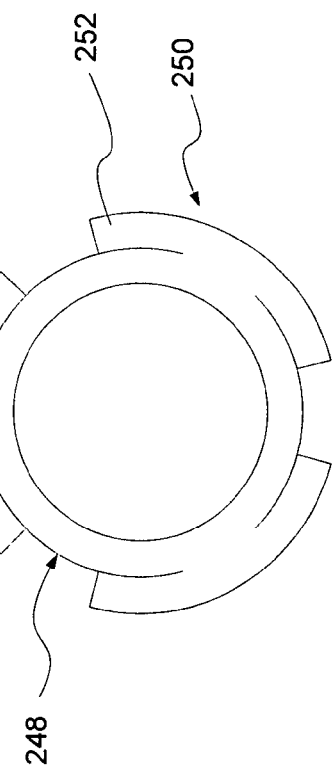
Figure 18G:
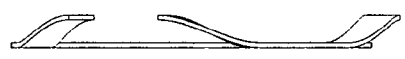

An alternative embodiment of the lower leg portion and the stopper is illustrated in FIGS. 14A-D, which illustrates sliding member 126' and stopping member 128' as part of lower leg 122'. In this embodiment, stopper 108' pivotally couples to lower leg 122' so that an audible indicator is generated upon extension and retraction of the stopper 108'. FIGS. 14A and 14B illustrate perspective views of the leg 102 or 104 in an extended position.

FIG. 14C is an enlarged view of section A-A from FIG. 14A. Here, it can be seen that the lower leg 122' preferably includes a boss 206, a protrusion 208, and a spring member 210. As shown, the spring member 210 is preferably attached at one end 212 to the lower leg 122' but has a second end 214 free to flex as the stopper 108' moves.

As with the stopper 108, the stopper 108' may be coupled to the lower leg 122' using a fastener such as a threaded screw or bolt 216. FIG. 14D is an enlarged view of the stopper 108, showing the pivot section 204 having through hole 200, a first receptacle 218 and a second receptacle 220. When the stopper 108' is coupled to the lower leg 122', the first receptacle receives the protrusion 208, and the second end 214 of the spring member 210 is received by the second receptacle 220.

FIG. 14D illustrates that the second receptacle preferably includes a raised member such as ramp 222. Thus, as the stopper 108' is adjusted between the open and closed positions, the second end 214 of the spring member 210 passes across the ramp 222. While passing over the ramp 222, the second end 214 is preferably compressed. And after passing beyond the ramp 222, the second end 214 preferably snaps into back into an uncompressed state, which desirably creates a clicking or other sound. This audible indicator lets the user know that the stopper 108' is now in the fully extended or fully closed position.

FIGS. 15 and 16 illustrate details of the legs 102 and 104 when in the closed and open positions, respectively. As seen in the closed views of FIGS. 15A-15C, the lower leg portion 122' (or 122) is retracted within the upper leg portion 120, specifically within the cavity 144. FIG. 15D illustrates a cutaway of the leg 102 or 104 taken along the 15A-15A line of FIG. 15C. As can be seen in this view, the lower leg portion 122 preferably includes a groove 224, and the cover section 124 preferably includes a stopping member 226.

FIG. 15E is an enlarged view taken about the 15B-15B section of FIG. 15D. Here, the spring member 195 of the lower leg portion 122' is shown adjacent to a projection 228 that is preferably molded into the upper leg portion 120. The projection 228 desirably abuts the spring member 195 and prevents removal of the lower leg portion 122 from the upper leg portion 120, unless sufficient force is applied to bend the spring member 195 to clear the projection 228. Once a sufficient amount of force is applied, for example by pulling on an exposed section of the lower leg portion 122, the lower leg portion may be partly or fully extended. While only one projection 228 is illustrated, any number of projections 228 may be employed to permit graduated extension of the lower leg portion 122.

FIGS. 16A-16E illustrate the leg 102 or 104 in the fully open position. FIG. 16D illustrates a cutaway of the leg 102 or 104 taken along the 16A-16A line of FIG. 16C, and FIG. 16E is an enlarged view taken about the 16B-16B section of FIG. 16D. As best seen in FIG. 16E, the stopping member 226 prevents further extension of the lower leg portion 122. Also, the upper leg portion preferably also includes another projection, namely projection 230. As the lower leg portion 122 is extended, the spring member 195 is deflected during its pass across the projection 230. Once it reaches full extension, the spring member 195 clears the projection 230, creating an audible indicator such as a clicking sound. This sound, as with the audible indicator created by interaction of the stopper 108' and the spring member 210 as discussed above. Thus, these two separate audible indicators let the user know that the lower leg portions 122 are fully extended and the stoppers 108' are also fully extended.

A discussion of various components and assembly of the pivot section 110 will now be presented with regard to FIGS. 17-22. As explained above, the pivot section 110 preferably includes a pivot device such as central pivot 130, which is illustrated in FIGS. 17A-17H. The perspective views of FIGS. 17A and 17B show that the central pivot 130 includes two main sections, namely a leg connection section 232 and a pivot member 234.

The leg connection section 232 preferably includes a pair of projections 236 each having a receptacle 238 therein adapted to receive the pivot pin 132. The pivot sections 170 of the upper leg portions 120 of the legs 102 and 104 are secured between the projections 236 and are permitted to pivot about the axis of the pivot pin 132.

The pivot member 234 is preferably circular from an aesthetic viewpoint and to reduce the amount of material required during manufacturing. The pivot member 234 includes a receptacle 240 having a central opening 242. As seen in FIGS. 17A and 17F, the receptacle 240 may also include an annular protrusion 244 and one or more holders 246.

FIGS. 18A-18H illustrate the spring device 138, which includes a circular central portion 248 that is adapted to fit about the annular protrusion 244. The spring device 138, which desirably has a finger disc spring configuration, preferably also includes one or more projections 250 that may be spaced around the central portion 248. Each projection 250 preferably includes a pair of extensions 252 angled away from the plane of the central portion 248.

FIGS. 19A-19H illustrate the engagement member 136, which may have a washer-type configuration. As shown, the engagement member 136 is generally circular in shape, and includes opening 254 therein. One or more projections 256 are preferably disposed along one face of the engagement member 136. And one or more extensions 258 may project along the edge of the engagement member 136.

The adjustment actuator 134 is illustrated in FIGS. 20A-20H. As shown, the adjustment actuator 134 has a generally circular configuration having a first side 260 and a second side 262. The first side 260, which is the side accessible to the user, desirably has a generally rounded or concave surface, although other any other shape is permissible. As seen in FIGS. 20G and 20H, the first side 260 need not be symmetrical. The second side 262 preferably includes a boss 264 and one or more elongated ridges 266, which are adapted to fit within the elongated openings 163 of the engagement member 158.

FIGS. 21A-H illustrate the cap 142. As shown, the cap 142 includes a first side 268 and a second side 270. The first side 268 may have an exterior surface of any shape, although it is preferably generally convex as shown. The second side 270 desirably has a receptacle section 272 and a projection 274.

Figure 22A:
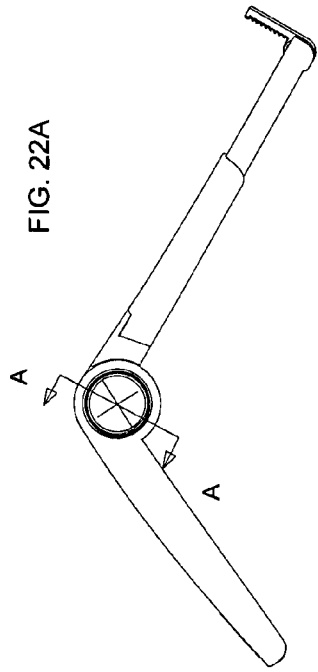
FIGS. 22A-22C illustrate stand assembly in accordance with aspects of the present invention.
Figure 22B:
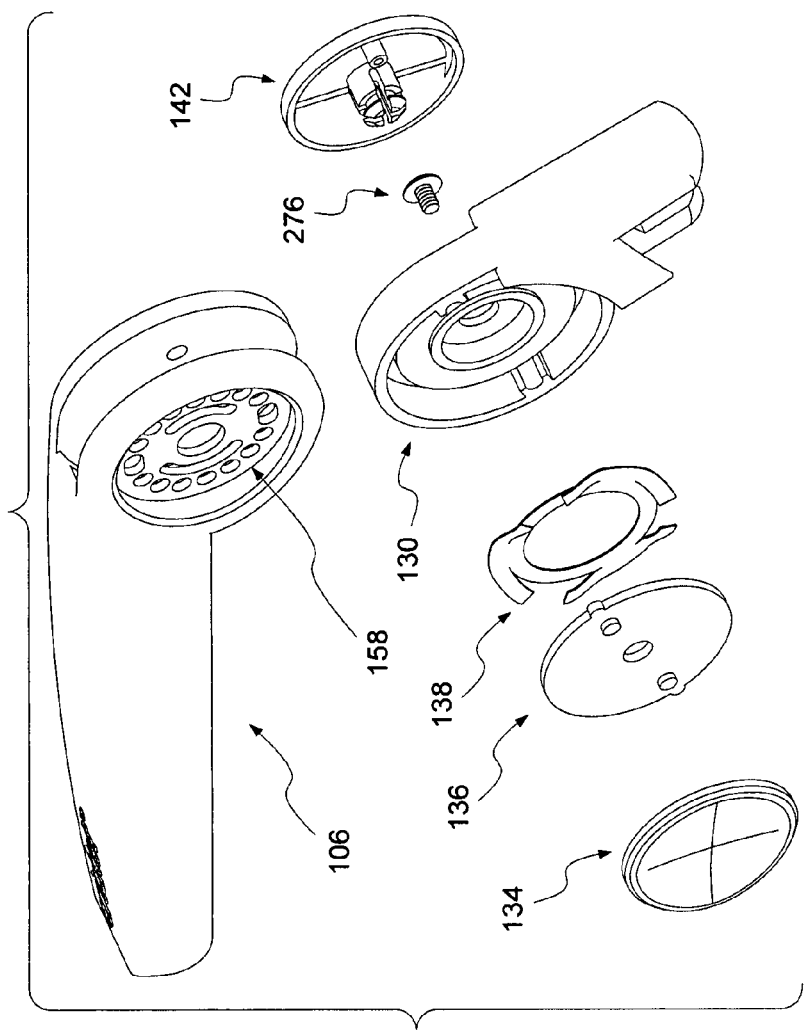

Assembly of the pivot section 110 will be discussed with regard to FIGS. 22A-22C. FIG. 22A is a side view of the stand 100 and FIG. 22B is an exploded view of the pivot section 110. Assembly may be achieved as follows. First, the spring device 138 and engagement member 136 are pressed into the receptacle 240 of the pivot member 234. The extensions 252 of the projections 250 preferably face the engagement member 136. The extensions 258 of the engagement member 136 fit in the holders 246 of the pivot member 234. Once the spring device 138 and engagement member 136 are received by receptacle 240, then the pivot member 234 is fitted between the extensions 157 of the pivot member 114. At this step, the projections 256 engage respective openings 162 on the engagement member 158.

The adjustment actuator 134 may now be fitted over the engagement member 158, with the elongated ridges 266 fitting within the elongated openings 163 of the engagement member 158. Then a fastener such as a screw 276 is fitted through the openings 242 and 254 and is secured to boss 264 of the adjustment actuator 134. At this point, the cap 142 may be fitted over the fastener 276, with the receptacle section 272 covering the fastener and securing the cap 142 to the fastener, while the projection 274 engages the offset opening 165 of one of the extensions 157.

Figure 22C:
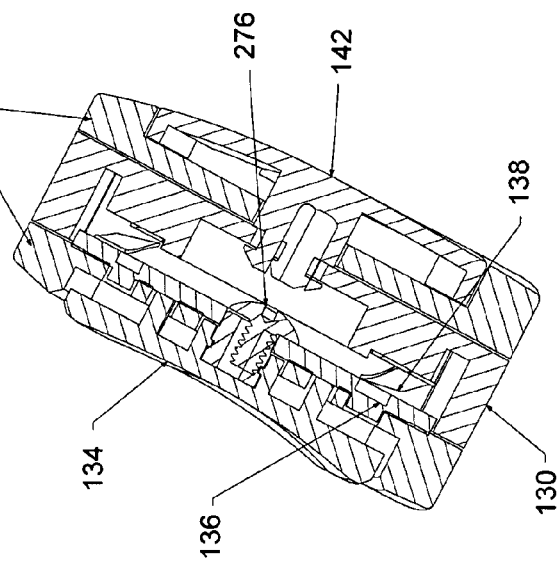

FIG. 22C is a cutaway view along the 22A-22A line of FIG. 22A. The cutaway view illustrates the relative positioning of the components of the pivot section 110. In order to open and close the stand's legs, the pivot section 110 may be operated as follows. First, the user may press the adjustment actuator 134 in toward the cap 142. This pushes on the engagement member 136, which cause compression of the spring device 138. This results in disengagement of the projections 256 from the openings 162 on the engagement member 158. The user is now able to adjust the legs 102 and 104 relative to the rear leg 106. When the adjustment actuator 134 is released, pressure from the spring device 138 forces the projections 256 to press against the engagement member 158. Aligning the projections 256 with respective openings 162 secures the legs 102 and 104 in a fixed position relative to the leg 106.

Once assembled, the stand 100 may be used in a wide range of positions and orientations. For instance, FIGS. 23A-23G illustrate numerous positions when the legs 102 and 104 are in a compact configuration. The displacement between the front legs 102 and 104 with respect to the rear leg 106 may range from a fully closed position of 0° to a minimally open position shown in FIG. 23A with the legs 102 and 104 being on the order of 150 or less from the leg 106 to a substantially fully extended position shown in FIG. 23G with the legs 102 and 104 being nearly 165°-180° from the leg 106. Any incremental range may be provided between the minimally open position to the substantially fully extended position. By way of example only, increments of 1°, 2°, 3°, 4°, 5°, 10°, 15° or 20° may be provided. The specific incremental positions preferably directly correspond with the spacing and placement of the series of openings 162 in the engagement member 158.

FIGS. 24A-24G numerous positions when the legs 102 and 104 are in a fully extended configuration. As with the compact arrangement, the displacement between the front legs 102 and 104 with respect to the rear leg 106 may range from a fully closed position of 0° to a minimally open position shown in FIG. 24A with the legs 102 and 104 being on the order of 15° or less from the leg 106 to a substantially fully extended position shown in FIG. 24G with the legs 102 and 104 being on the order of 165°-180° from the leg 106.

Although the invention herein has been described with reference to particular embodiments, it is to be understood that these embodiments are merely illustrative of the principles and applications of the present invention. For instance, the stand may or may not include audible indicators, or may incorporate visual or textural indicators in lieu of or in conjunction of the audible indicators. Furthermore, the lower leg portions may be adjustable only between the fully closed and fully opened positions, or may be adjustable among any number of increments between fully closed and fully opened. All features in any of the embodiments are usable with all other embodiments presented herein. It is therefore to be understood that numerous modifications may be made to the illustrative embodiments and that other arrangements may be devised without departing from the spirit and scope of the present invention as defined by the appended claims.

The invention claimed is:

1. A portable support stand for supporting an electronic device, the stand comprising:
    a first support leg having an elongated body and a pivot member, the elongated body including a first end for contacting a support surface and a second end remote from the first end, and the pivot member being disposed adjacent the second end of the elongated body;
    an adjustment member rotatably coupled to the pivot member of the first support leg; and
    a pair of adjustable support legs each having a respective first leg member and a respective second leg member slideably attached to the respective first leg member thereof:
    each first leg member having a first end pivotally coupled to the adjustment member, a second end remote from the first end and a receptacle disposed between the first and second ends, and
    each second leg member having first and second ends thereof, the second leg members being operable to move between a compact position in which the respective second leg member is substantially received within the receptacle of the respective first leg and an extended position in which the second leg member is substantially removed from the receptacle of the respective first leg member;
    wherein the pair of adjustable support legs is operable to jointly rotate between a closed position adjacent to the first support leg and an open position with the second ends of the first and second leg members spaced apart from the first end of the first support leg.

2. The portable support stand of claim 1, further comprising a pair of stopper members each having first and second ends, the first end of each stopper member being coupled to the second end of a respective one of the second leg members, each stopper member being operable to move between a closed position with the second end of the stopper member adjacent the second end of the respective second leg member and an open position with the second end of the stopper member not adjacent the second end of the respective second leg member.

3. The portable support stand of claim 2, wherein the stopper members are rotatably coupled to the second ends of the respective second leg members, and the open position is substantially perpendicular to the closed position.

4. The portable support stand of claim 1, wherein in the open position the first ends of the first support leg and the adjustable support legs are in contact with the support surface, and the pivot section is elevated above the support surface.

5. The portable support stand of claim 1, wherein the pivot member includes a first engagement member and the adjustment member includes a second engagement member adjustably coupled to the first engagement member to lock the adjustable support legs in the closed position and in the open position, and to permit movement of the adjustable support legs between the closed and open positions.

6. The portable support stand of claim 5, wherein the first engagement member includes a plurality of connectors and the second engagement member includes at least one connection member operable to couple with a first one of the plurality of connectors in the closed position and with a second one of the plurality of connectors in the open position.

7. The portable support stand of claim 5, further comprising a spring device substantially disposed between the pivot member and the second engagement member.

8. The portable support stand of claim 1, wherein each of the adjustable support legs includes means for producing an audible indicator to identify when the respective adjustable support leg is in the compact or extended position.

9. A portable support stand for supporting an electronic device, the stand comprising:
a first support leg having an elongated body including a first end for contacting a support surface and a second end remote from the first end;
a pair of adjustable support legs; and
an adjustment member rotatably coupling the pair of adjustable support legs to the second end of the first support leg, the adjustment member including:
a first engagement member coupled to the first support leg, the engagement member having a first surface including plurality of first connection members distributed about a central rotation point and at least one second connection member disposed in the first surface;
a pivot device including a first section adjustably coupled to the engagement member and a second section adjustably coupled to both first leg members;
a second engagement member including at least one connection member operable to releasably engage at least one of the first connection members of the first engagement member;
a spring device substantially disposed between the pivot device and the second engagement member; and
an adjustment actuator coupled to the second engagement member, wherein when the adjustment actuator is in a first state the at least one connection member of the second engagement member is securely coupled to at least one of the first connection members of the first engagement member and when the adjustment actuator is in a second state the at least connection member of the second engagement member is decoupled from the at least one first connection member so that the pair of adjustable support legs is moveable between a closed position adjacent to the first support leg and an open position with the second ends of the first and second leg members spaced apart from the first end of the first support leg;
wherein the spring device is adapted to bias the adjustment actuator in the first state.

10. The portable support stand of claim 9, wherein the pair of adjustable support legs each includes a first leg member and a second leg member slideably coupled to the respective first leg member thereof.

11. The portable support stand of claim 10, wherein the first support leg has a fixed length.

12. The portable support stand of claim 9, wherein the plurality of first connection members are distributed in a circular arrangement about the central rotation point.

13. The portable support stand of claim 12, wherein the plurality of first connection members are receptacles, and the at least one connection member comprises at least one projection operable to releasably engage at least one respective connection members.

14. The portable support stand of claim 9, further comprising at least one magnet received in the first support leg for magnetically securing the pair of adjustable support legs to the first support leg in the closed position.

15. The portable support stand of claim 9, further comprising a pair of stopper members, a first one of the stopper members being coupled to a first one of the adjustable support legs and a second one of the stopper members being coupled to a second one of the adjustable support legs, the pair of stopper members being moveable between a compact position when the support stand is in the closed position and an extended position when the support stand is in the open position.

16. The portable support stand of claim 15, wherein the electronic device is operable to rest on the support stand at three points when the support stand is in the open position, the pair of stopper members each providing a first point of contact for the electronic device and the first support leg provides a second point of contact for the electronic device in a tripod arrangement.

17. The portable support stand of claim 15, wherein in the open position the support stand has a double tripod configuration for supporting the electronic device and for contacting the support surface.

18. The portable support stand of claim 17, wherein in the double tripod configuration the first end of the first support leg providing a first point of contact with the support surface and the pair of stopper members each providing separate second points of contact with the support surface, and the second end of the first support leg providing a first point of contact for the user device and the pair of stopper members each provide separate second points of contact for the user device.

19. A portable support stand for supporting an electronic device, the stand comprising:
a first support leg having an elongated body, the elongated body including a first end for contacting a support surface and a second end remote from the first end, the second end comprising a pivot member that is an integral part of the elongated body and is rigidly attached thereto;
an adjustment member coupled to the pivot member of the first support leg, the adjustment member being rotatable relative to the pivot member about a first axis of rotation; and a pair of adjustable support legs each having a respective first leg member and a respective second leg member slideably attached to the respective first leg member thereof, each first leg member having a first end that is pivotally coupled to the adjustment member, is rotatable about a second axis of rotation that is non-parallel to the first axis of rotation and is otherwise rotationally-fixed relative to the adjustment member, each first leg member having a second end remote from the first end and a receptacle disposed between the first and second ends, and each second leg member having first and second ends thereof, the second leg members being operable to move between a compact position in which the respective second leg member is substantially received within the receptacle of the respective first leg and an extended position in which the second leg member is at least partially removed from the receptacle of the respective first leg member;

wherein the pair of adjustable support legs is operable to jointly rotate between a closed position adjacent to the first support leg and an open position with the second ends of the pair of adjustable support legs and second leg members spaced apart from the first end of the first support leg.

\* \* \* \* \*